(12) United States Patent
Inoue

(10) Patent No.: US 8,436,803 B2
(45) Date of Patent: May 7, 2013

(54) IMAGE DISPLAY DEVICE AND IMAGE DISPLAY METHOD

(75) Inventor: Takamasa Inoue, Ohtawara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1019 days.

(21) Appl. No.: 11/916,245

(22) PCT Filed: May 30, 2006

(86) PCT No.: PCT/JP2006/310714
§ 371 (c)(1),
(2), (4) Date: Feb. 27, 2008

(87) PCT Pub. No.: WO2006/129627
PCT Pub. Date: Dec. 7, 2006

(65) Prior Publication Data
US 2010/0188325 A1    Jul. 29, 2010

(30) Foreign Application Priority Data

Jun. 2, 2005  (JP) .................................. 2005-162747
May 26, 2006  (JP) .................................. 2006-147087

(51) Int. Cl.
*G09G 3/36*        (2006.01)

(52) U.S. Cl.
USPC ......................................... 345/102; 345/207

(58) Field of Classification Search .................. 345/102, 345/207, 211–213, 77; 348/687–689
See application file for complete search history.

(56) References Cited

U.S. PATENT DOCUMENTS

| | | | |
|---|---|---|---|
| 4,952,917 A * | 8/1990 | Yabuuchi ....................... | 345/690 |
| 6,337,675 B1 * | 1/2002 | Toffolo et al. .................. | 345/77 |
| 6,597,339 B1 * | 7/2003 | Ogawa .......................... | 345/102 |
| 6,812,649 B2 * | 11/2004 | Kim ............................... | 315/149 |
| 7,629,971 B2 * | 12/2009 | Plut ............................... | 345/211 |
| 2001/0043277 A1 * | 11/2001 | Tanaka et al. ............ | 348/333.01 |
| 2003/0128220 A1 * | 7/2003 | Ubillos ........................... | 345/593 |
| 2004/0183765 A1 | 9/2004 | Morisawa | |
| 2004/0207613 A1 | 10/2004 | Morisawa | |
| 2005/0264702 A1 * | 12/2005 | Yoshii ........................... | 348/687 |

FOREIGN PATENT DOCUMENTS

| | | |
|---|---|---|
| CN | 1393728 A | 1/2003 |
| DE | 199 56 113 A1 | 5/2001 |
| EP | 1 569 196 A2 | 8/2005 |
| JP | 2000-47629 A | 2/2000 |
| JP | 2001-111916 A | 4/2001 |

(Continued)

*Primary Examiner* — Amr Awad
*Assistant Examiner* — Aaron Midkiff
(74) *Attorney, Agent, or Firm* — Birch, Stewart, Kolasch & Birch, LLP

(57) ABSTRACT

An image display device adjusts display luminance in accordance with a surrounding illuminance. Since the display luminance considered to be appropriate differs depending on a user, the image display device includes a display unit operating according to a display luminance calculated based on the surrounding illuminance. For example, in the image display device, a user can set a range of the display luminance as a predetermined rule. The image display device provides a user interface enabling a user to easily input the predetermined rule or perform the setting input without being aware of it. That is, when the surrounding illuminance is above a predetermined illuminance, an input bar indicates only the range where the maximum value can be set as an input screen and when the surrounding illuminance is below the predetermined illuminance, the input bar indicates only the range where the minimum value can be set.

9 Claims, 21 Drawing Sheets

FOREIGN PATENT DOCUMENTS

| | | |
|---|---|---|
| JP | 2001-522058 A | 11/2001 |
| JP | 2002-323690 A | 11/2002 |
| JP | 2003-270613 A | 9/2003 |
| JP | 2003-323169 A | 11/2003 |
| JP | 2004-40498 A | 2/2004 |
| JP | 2004-133248 A | 4/2004 |
| JP | 2004-272156 A | 9/2004 |
| JP | 2005-258404 A | 9/2005 |

* cited by examiner

Fig17

| Header | Resource list | BML document <Genre: Sports> | |
|--------|---------------|------------------------------|--|

IMAGE DISPLAY DEVICE AND IMAGE DISPLAY METHOD

BACKGROUND OF THE INVENTION

1. Field of the Invention

The present invention relates to an image display apparatus displaying an image in accordance with inputted image data, and to a method for adjusting display luminance of the image in accordance with surrounding illuminance of the apparatus.

2. Description of the Related Art

It is known that the human eye has a high resolution performance for brightness in low luminance light (dark light), and a low resolution performance for high luminance light (bright light). Therefore, the human can well perceive tone variation of an image in a dark room (under an environment of low surrounding illuminance), but cannot well perceive tone variation of an image in a bright room (under an environment of high surrounding illuminance). Further, it is pointed out that this effect on perception of tone variation caused by the surrounding illuminance is significant in the perception of the low-tone portion in an image. In the Japanese Unexamined Patent Application Publication No. 2004-272156, an image display apparatus, in which surrounding illuminance of the apparatus is measured, and in the case of low illuminance, display luminance of the low-tone portion in the image display apparatus is reduced, and the image is displayed in small tone variations (small luminance variation), and in the case of high illuminance, display luminance of the low-tone portion in the image display apparatus is increased, and the image is displayed in large tone variations (large luminance variation), is disclosed.

SUMMARY OF THE INVENTION

However, in the above image display apparatus adjusting display luminance according to surrounding illuminance, a deficiency exists in which the best display luminance differs from one individual to another. Therefore, a user, who is unsatisfied with the image display by the conventional image display apparatus with a display luminance adjustment function, has no choice but to switch off the display luminance adjustment function, or to watch the image unsuitable for the user.

In order to solve the above deficiency, an aspect in accordance with the present invention provides an image display apparatus, comprising, a display unit, which operates in accordance with calculated luminance, a detection unit for illuminance, which detects surrounding illuminance, a calculation unit for display luminance, which calculates the display luminance of the display unit based on the surrounding illuminance detected by the detection unit for illuminance and on a predetermined rule, a storing unit for rule, which stores the predetermined rule, and a variation unit for rule, which varies the rule stored in the storing unit for rule.

Moreover, an aspect in accordance with the present invention provides the image display apparatus, wherein the storing unit for rule further comprises, storing means for candidate rule, which stores a plurality of candidate rules utilizable for calculation as the predetermined rule by the calculation unit for display luminance, and the calculation unit for display luminance further comprises, selection means, which selects a rule to be utilized as the predetermined rule from the plurality of candidate rules stored in the storing means for candidate rule.

Moreover, an aspect in accordance with the present invention provides the image display apparatus, wherein the selection means acquires one or more than one of a combination of a type of content to be a display object, a type of received broadcast data to be a display object, control information of displayed content correlated with the content to be a display object, and control information of displayed broadcast data, thereby carrying out the selection in accordance with the information of the acquired one or more than one combination of them.

Moreover, an aspect in accordance with the present invention provides the image display apparatus, wherein the storing unit for rule further comprises, storing means for luminance range rule, which stores a rule for determining a maximum value and a minimum value of the display luminance determined in accordance with the surrounding illuminance as the predetermined rule Moreover, an aspect in accordance with the present invention provides the image display apparatus, wherein the variation unit for rule further comprises external input means, which utilizes user interface on the display; and variation means for luminance range rule, which varies the maximum value and the minimum value in accordance with the inputted value by the external input means.

Moreover, an aspect in accordance with the present invention provides the image display apparatus, wherein the variation unit for rule further comprises variation restriction means dependent on illuminance, which restricts the variation by the variation means for luminance range rule in accordance with the surrounding illuminance detected by the detection unit for illuminance.

Moreover, an aspect in accordance with the present invention provides the image display apparatus, wherein the variation restriction means dependent on illuminance restricts the variation, so that only the maximum value in the storing means for luminance range rule is variable if the surrounding illuminance is more than the predetermined illuminance, or restricts the variation, so that only the minimum value in the storing means for luminance range rule is variable if the surrounding illuminance is less than the predetermined illuminance.

Moreover, an aspect in accordance with the present invention provides the image display apparatus, wherein the external input means further comprises an input bar indicator, which indicates an input bar indicating only an assignable range of the maximum value as an input screen in cases where the surrounding illuminance is more than the predetermined illuminance, or an input bar indicating only an assignable range of the minimum value as an input screen in cases where the surrounding illuminance is less than the predetermined illuminance.

Moreover, an aspect in accordance with the present invention provides the image display apparatus, further comprising, an operation unit based on instant reflection, which operates the display unit displaying the user interface screen based on the display luminance value calculated in accordance with the rule varied based on the inputted value from the external input means.

Moreover, an aspect in accordance with the present invention provides the image display apparatus, wherein the detection unit for illuminance further comprises stopping means for detection function, which turns off detection of illuminance in cases where the varying process of the information for determining luminance range in the rule stored in the storing unit for rule is carried out based on the input from the external input means.

In addition, as a method for causing a computer to carry out the above image display, an aspect in accordance with the present invention provides an image display method, comprising, a recording step, which records in order to store a predetermined rule, a variation step for rule, which varies the predetermined rule recorded and stored in the recording step, a detection step for illuminance, which detects a surrounding illuminance, a calculation step for display luminance, which calculates display luminance of a display unit based on the surrounding illuminance detected by the detection step for illuminance and on the predetermined rule, and an operation step for display, which operates the display unit in accordance with the calculated luminance.

Moreover, an aspect in accordance with the present invention provides the image display method, wherein the predetermined rule recorded in the recording step is a plurality of candidate rules, comprising, a selection step, which selects a rule to be utilized in the calculation step for display luminance as the predetermined rule from the plurality of candidate rules which have been recorded and stored.

Moreover, an aspect in accordance with the present invention provides the image display method, wherein the selection step acquires one or more than one of a combination of a type of content to be a display object, a type of received broadcast data to be a display object, control information of displayed content correlated with the content to be a display object, and control information of displayed broadcast data, thereby carrying out the selection in accordance with the information of the acquired one or more than one combination of them.

Moreover, an aspect in accordance with the present invention provides the image display method, wherein the predetermined rule recorded and stored in the recording step is a luminance range rule, which stores a rule for determining a maximum value and a minimum value of the display luminance determined in accordance with the surrounding illuminance.

Moreover, an aspect in accordance with the present invention provides the image display method, wherein the variation step for rule further comprises, an external input step, which inputs a value by means of a user interface on the display unit, and a variation step for luminance range rule, which varies the maximum value and minimum value in accordance with the inputted value in the external input step.

Moreover, an aspect in accordance with the present invention provides the image display method, wherein the variation step for luminance range rule is a variation step for luminance range rule with restriction on variation dependent on illuminance, which restricts variation in accordance with the surrounding illuminance detected in the detection step for illuminance.

Moreover, an aspect in accordance with the present invention provides the image display method, wherein the variation step for luminance range rule with restriction on variation dependent on illuminance restricts the variation, so that only the maximum value in the luminance range rule is variable if the surrounding illuminance is more than the predetermined illuminance, or restricts the variation, so that only the minimum value in the luminance range rule is variable if the surrounding illuminance is less than the predetermined illuminance.

Moreover, an aspect in accordance with the present invention provides the image display method, wherein the external input step displays an input bar indicating only an assignable range of the maximum value as an input screen in cases where the surrounding illuminance is more than the predetermined illuminance, or an input bar indicating only an assignable range of the minimum value as an input screen in cases where the surrounding illuminance is less than the predetermined illuminance.

Moreover, an aspect in accordance with the present invention provides the image display method, further comprising, an operation step based on instant reflection, which operates the display unit displaying the user interface screen based on the display luminance value calculated in accordance with the rule varied based on the inputted value in the external input step.

Moreover, an aspect in accordance with the present invention provides the image display method, wherein the detection step for illuminance further comprises a stopping step for detection function, which turns off detection of illuminance in cases where the varying process of the information for determining luminance range in the rule, which has been recorded and stored, is carried out based on the input from the external input step.

According to the present invention having the above configuration, for example, a user can watch an image, of which display luminance is controlled within luminance arbitrarily configured by the user in accordance with surrounding illuminance. Therefore, it becomes possible to watch an image, of which display luminance fits to the illuminance of environment, and according to the user's taste. In addition, by means of a user interface displayed by the above configuration, the user can set the above predetermined rule without being conscious of setting the luminance range etc.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 17 is a conceptual diagram exemplifying the data portion of digital broadcast wave including a type of content acquired by the selection means in the image display apparatus of the second embodiment;

DETAILED DESCRIPTION OF THE INVENTION

Embodiments of the present invention will be described hereinbelow with reference to the drawings. The present invention is not to be limited to the above embodiments and able to be embodied in various forms without departing from the scope thereof.

First Embodiment

<Concept of First Embodiment>

Figure 1:
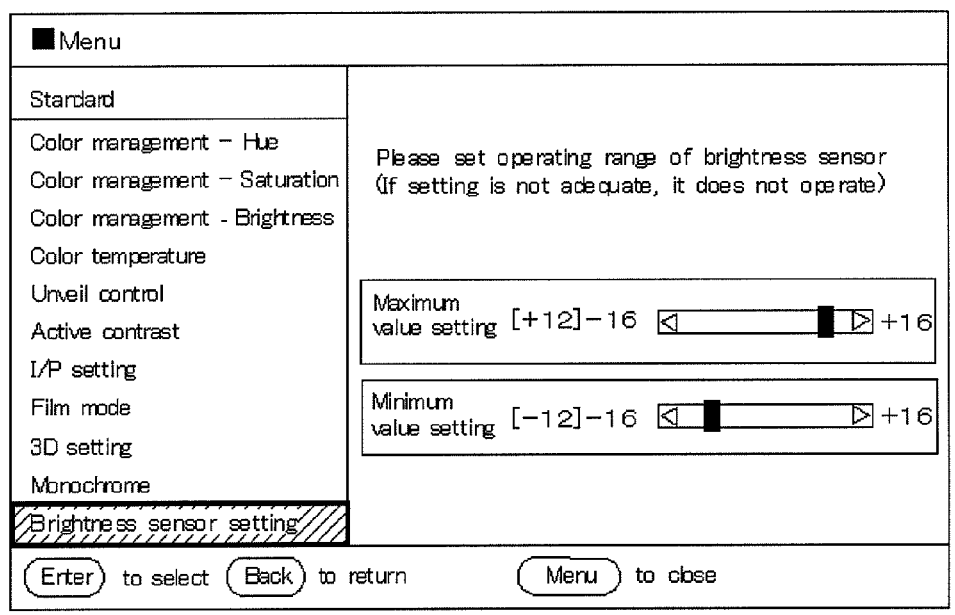
FIG. 1 is a diagram for exemplifying user interface in an image display apparatus of a first embodiment.

FIG. 1 is a diagram for exemplifying user interface in an image display apparatus of a first embodiment having a function of varying display luminance in accordance with surrounding illuminance. Concretely speaking, a schematic diagram exemplifying a user interface for the user to arbitrarily set the upper/lower limit of the adjustment range of the display luminance. As shown in FIG. 1, the various setting items such as the color management including hue, saturation, and brightness, and the active contrast are indicated in a selectable state. Additionally, a setting item 'brightness sensor' for the user to arbitrarily set an adjustment range of the display luminance is also indicated therein.

Here, for example, a user watches a movie on DVD in a dark room. Then, the image display apparatus of the first embodiment detects the darkness by means of a brightness sensor etc., and carries out display, for example, at a setting value '−16', which is a automatically reduced display luminance. However, the display at the luminance of this setting value '−16' is too dark for the user to watch. Therefore, the user calls up the above menu screen as shown in FIG. 1 on the display through operation of remote control, and selects the item 'brightness sensor'. Then, the slider bars for 'setting maximum value' and 'setting minimum value' as indicated in FIG. 1 are displayed. The user moves the slider bar to right or left, and sets the bar to the desired position, so that, for example, it becomes possible to arbitrarily vary the setting value from the initial value '−6' to '−12'. Accordingly, the user can watch the image at the desired display luminance.

<Configuration of First Embodiment>

Figure 2:
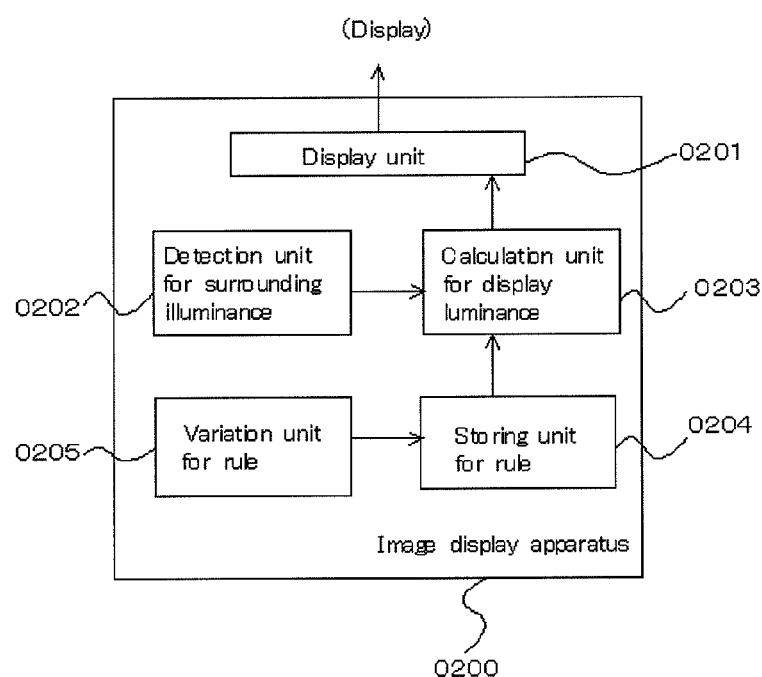
FIG. 2 is a functional block diagram of the image display apparatus of the first embodiment.

FIG. 2 is a functional block diagram of the image display apparatus of the first embodiment. As shown in FIG. 2, the 'image display apparatus' (0200) of the first embodiment comprises, a 'display unit' (0201), a 'detection unit for surrounding illuminance' (0202), a 'calculation unit for display luminance' (0203), a 'storing unit for rule' (0204), and a 'variation unit for rule' (0205).

Note that, the functional block of the present system described hereinbelow can be implemented by hardware, software, or both hardware and software. Specifically, in the case of using a computer, examples of the hardware component include a CPU, a main memory, a bus, a storage device such as a hard disk or a nonvolatile memory, a storage media such as CD-ROM or DVD-ROM, a reading drive for the above media, a transmission/reception port for various communications and printing device, and other peripheral devices, and a driver program for controlling the above hardwares, and other application programs, and an interface for inputting information. The above hardware and software are used for sequential execution of programs operated on the memory by CPU, for processing, storing and outputting of the data inputted via the interface, or for controlling the respective hardware components.

Moreover, the present invention can be implemented not only as a system, but also as a method thereof. Moreover, a portion of such inventions may be configured as software. Furthermore, a software product used for causing a computer to execute the software, and the recording medium, in which the software is installed, should be included in the technical scope of the present invention (the same applies throughout the entire specification).

The 'display unit' (0201) is a display operating in accordance with calculated display luminance calculated by the after-mentioned calculation unit for display luminance (0203). Examples of the display unit include non-luminescence type displays such as a liquid-crystal display or a micro-mirror display, or luminous type displays such as a plasma display, an electroluminescence display, a field emission display, and a fluorescent display. Further, for example, in the case of a liquid-crystal display, this display unit has a configuration, in which display luminance is adjustable by adjusting the amount backlight, or by biasing input video signal etc., so that it becomes possible to display an image in accordance with the display luminance based on the calculation by the after-mentioned calculation unit for display luminance.

The 'detection unit for illuminance' (0202) has a function of detecting a surrounding illuminance, and may be configured, for example, by brightness sensor etc. for detecting surrounding illuminance by means of a photoconductive element. An example of the photoconductive element includes Cds cell, in which free electron is generated in semiconductor in proportion to amount of received light, and flow of electric current changes, thereby lowering the resistance value. Of course, the brightness sensor is not limited to this. The 'surrounding illuminance' corresponds to surrounding illuminance of the image display apparatus, and range of the surrounding area is not limited. It is preferable that the surrounding area is within a spatial range, which has an effect on visual and auditory senses. This surrounding illuminance is detected by means of the above brightness sensor, for example, a dark room 0 lux, and outside of a house 600 lux. Of course, the present invention is not limited to a method for directly detecting surrounding illuminance by means of photoelectric conductive element, and may be various methods, in which detection of surrounding illuminance is carried out by detecting illuminance on a display surface affected by surrounding illuminance.

The 'calculation unit for display luminance' (0203) has a function of calculating the display luminance of the display unit based on the surrounding illuminance detected by the detection unit for illuminance (0202) and on a predetermined rule. The 'predetermined rule' is a rule used for calculating the display luminance, and is normally preset. Note that the display luminance calculated by this calculation unit for display luminance may be a luminance value of respective pixels, or may be a calculated value as a representative setting value. In cases where the representative setting value is calculated, correction of the luminance value of the respective pixels is carried out in accordance with the display luminance value (representative value) upon outputting it to the display.

Figure 3:
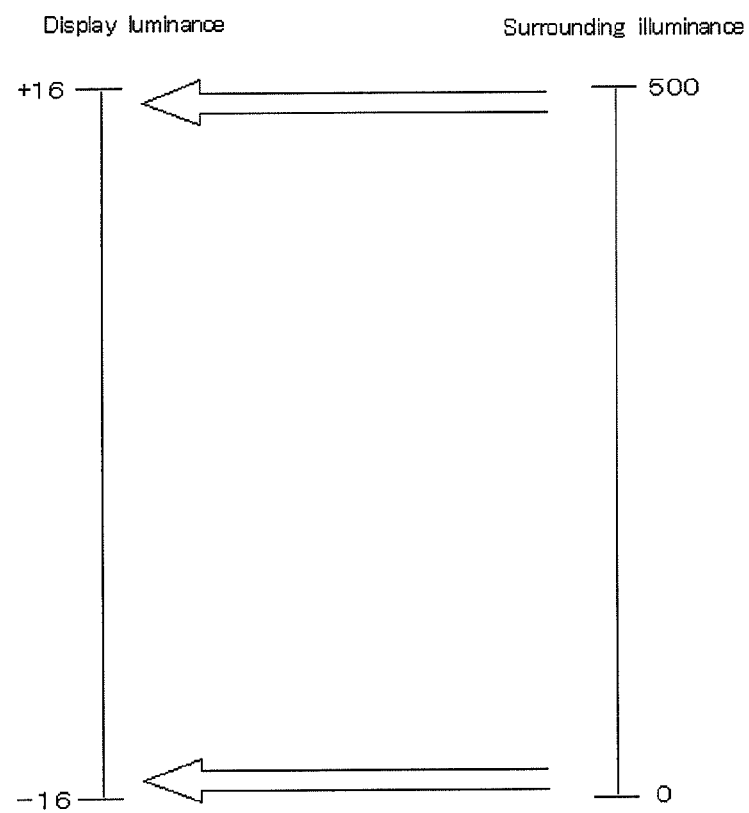
FIG. 3 is a diagram exemplifying a predetermined rule in the conventional image display apparatus.

FIG. 3 is a diagram exemplifying a predetermined rule in the conventional image display apparatus. As shown in FIG. 3, in the conventional image display apparatus, for example, a rule, in which if the surrounding illuminance is 500 lux, the setting value of display luminance is '+16', is predetermined. Alternatively, a rule, in which if the surrounding illuminance is 0 lux, the setting value of display luminance is '−16', is predetermined. Therefore, the setting value of display illuminance is acquired by the calculation unit for display luminance based on the surrounding illuminance detected by the detection unit for surrounding illuminance and on the predetermined rule. Thus, the calculation by the calculation unit for display luminance includes not only four arithmetic calculations but also acquisition of data indicating correspondence between the above surrounding illuminance and the display luminance from database etc.

The calculation by this calculation unit for display luminance is carried out as follows by means of the hardware resource of the apparatus. At the outset, information to be a key of starting calculation such as switching on of the image display apparatus of the first embodiment is detected. Further, in accordance with the detection, information, which specifies storage area storing a program for calculating the display luminance, and instructs reading, is outputted. Then, the calculation program stored in a predetermined area of storage such as a hard disk is operated on a work area in a memory in accordance with output of this information, and is sequentially executed by central processing circuit etc. Then, the execution of this calculation program is carried out, so that numerical value indicating surrounding illuminance detected by the detection unit for surrounding illuminance and information indicating an address of the storage area are stored in the predetermined area in the storage area of memory.

Subsequently, information for instructing to specify and read the storage area to acquire information indicating the predetermined rule stored in the predetermined storage area of the storage such as hard disk is outputted. Then, the information indicating predetermined rule and information indicating an address of the storage area are stored in another predetermined area in the storage area of memory. In logical calculations by the CPU, the numerical value indicating surrounding illuminance stored in the predetermined area of memory and the numerical value indicated by the predetermined rule are compared. Then, information indicating setting value of the corresponding display luminance is acquired, and is stored in the predetermined area in the storage area of memory with information indicating an address of the storage area. After that, the display luminance thus acquired is utilized for a program for controlling adjustment of display luminance of the display, so that it becomes possible for the image display apparatus to display at display luminance in accordance with the surrounding illuminance.

However, in cases where the user is not satisfied with the image and its quality displayed at the display luminance adjusted based on the setting determined by the predetermined rule, the image display apparatus of the first embodiment may have a configuration, in which a 'storing unit for rule' (0204), and a 'variation unit for rule' (0205) are further comprised, so that the user can arbitrarily vary the above-mentioned predetermined rule, and the rule is updated and stored.

The 'storing unit for rule' (0204) has a function of storing a predetermined rule. An example of the predetermined rule stored in this storing unit for rule includes information indicating a formula f(x) for calculating a setting value of display luminance from an illuminance value. An example of the formula includes a formula 'f(x)=32/500−16' if f(x) is a setting value of display luminance, and x is surrounding illuminance. This is a case where the setting value of display luminance, which has proportional relation with the surrounding illuminance, is set. Of course, the formula as a predetermined rule is not limited to the above example, and a predetermined rule of another formula, which is indicated by the following database, in which range of surrounding illuminance and setting value of display luminance are correlated. For example, a predetermined rule indicated by correlation of data, in which if the surrounding illuminance is 0-100 lux, the setting value of display luminance is '−16', and if the surrounding illuminance is greater than 500 lux, the setting value of display luminance is '−16'. The predetermined rule indicated by the above formula f(x) or by the correlation of data is stored in the storing unit for rule. For example, the above configuration is implemented by storing into a predetermined address of a memory medium such as a semiconductor memory or a hard disk drive. Further, the predetermined rule thus stored in the storing unit for rule is arbitrarily varied by a user and is updated in the after-mentioned variation unit for rule.

Note that the 'storing unit for rule' of the image display apparatus of the first embodiment may further comprise a 'storing means for luminance range rule' (not shown). The 'storing means for luminance range rule' has a function of storing a luminance range rule. The 'luminance range rule' is a predetermined rule for determining a maximum value and a minimum value of the display luminance determined in accordance with the surrounding illuminance. According to this, for example, it becomes possible to complete the after-mentioned variation of predetermined rule in the variation unit for rule just by setting the maximum and minimum values by the user.

The 'variation unit for rule' (0205) has a function of varying the rule stored in the storing unit for rule (0204). For example, the variation in this variation unit for rule is carried out by a method, in which a formula g(x), a new predetermined rule, is acquired via network etc. from external apparatus, and a predetermined rule stored in the storing unit for rule is updated, thereby varying the rule. Alternatively, a method, in which the predetermined rule is varied by updating the numerical value indicating the correlation between the surrounding illuminance range and the display luminance data to the numerical value inputted by operation of a keyboard or button of a remote control etc., may be used.

Figure 4:
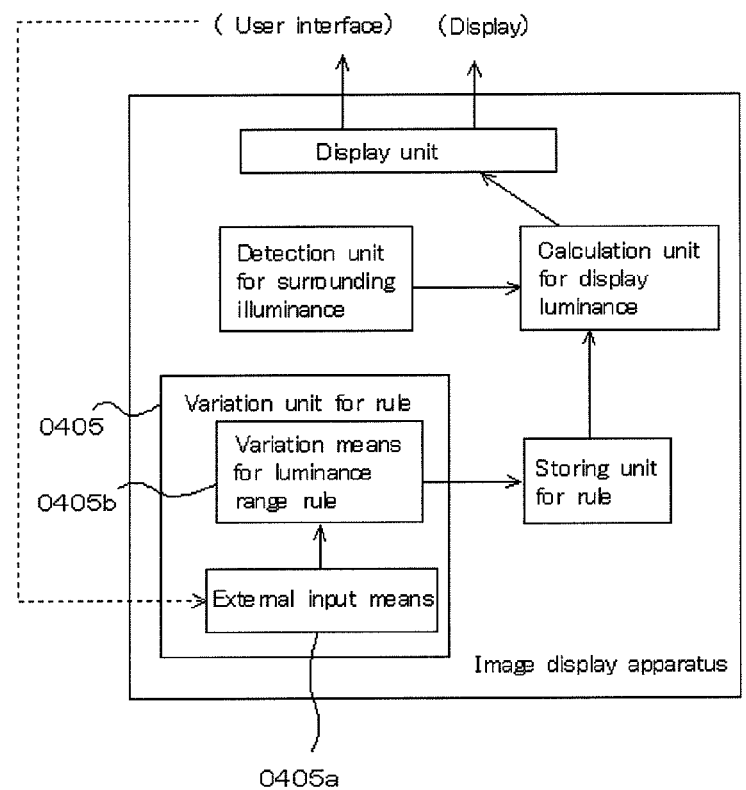
FIG. 4 is a functional block diagram of another image display apparatus of the first embodiment.

In addition, variation of luminance range rule stored in the storing unit for luminance range rule may be carried out by this variation unit for rule. For this purpose, the image display apparatus of the first embodiment may further comprise the following functional block as shown in FIG. 4.

Therefore, the image display apparatus of the first embodiment comprises the above-mentioned 'display unit', the 'detection unit for surrounding illuminance', the 'calculation unit for display luminance', the 'storing unit for rule', the 'variation unit for rule', and the 'storing unit for luminance range rule'. Additionally, the 'variation unit for rule' (0405)

further comprises an 'external input means' (0405a), and a 'variation means for luminance range rule' (0405b).

The 'external input means' (0405a) has a function, for example, of inputting value by means of user interface on the display. An example of this 'user interface' utilized by the external input means includes GUI (Graphical User Interface) as shown in FIG. 1. In the user interface of FIG. 1, for example, display for a user to arbitrarily set the maximum and minimum values for determining the luminance range as a predetermined rule is carried out by moving the input bar such as a slider bar indicating luminance range. Of course, in this user interface, if the maximum value to be set is less than the minimum value, problem is caused in adjustment of the display luminance, so that a configuration, in which if such setting is done, a warning is indicated, or the range of moving the bar indicated in the input bar for setting the maximum value is restricted so as to be greater than the minimum value set before the setting of the maximum value, may be used.

Further, in cases where the range of the maximum and minimum values in accordance with the surrounding illuminance, which has been set, is narrow, trouble such as flicker can be caused depending on resolution of display luminance of a backlight or a display. Therefore, a configuration, in which a predetermined threshold etc. is provided, and such narrow range is detected, so that a warning is indicated for variation of the value, or the variation itself is impossible, may be used.

The 'variation means for luminance range rule' (0405b) has function of varying the maximum value and the minimum value in accordance with the inputted value by the external input means.

Figure 5:
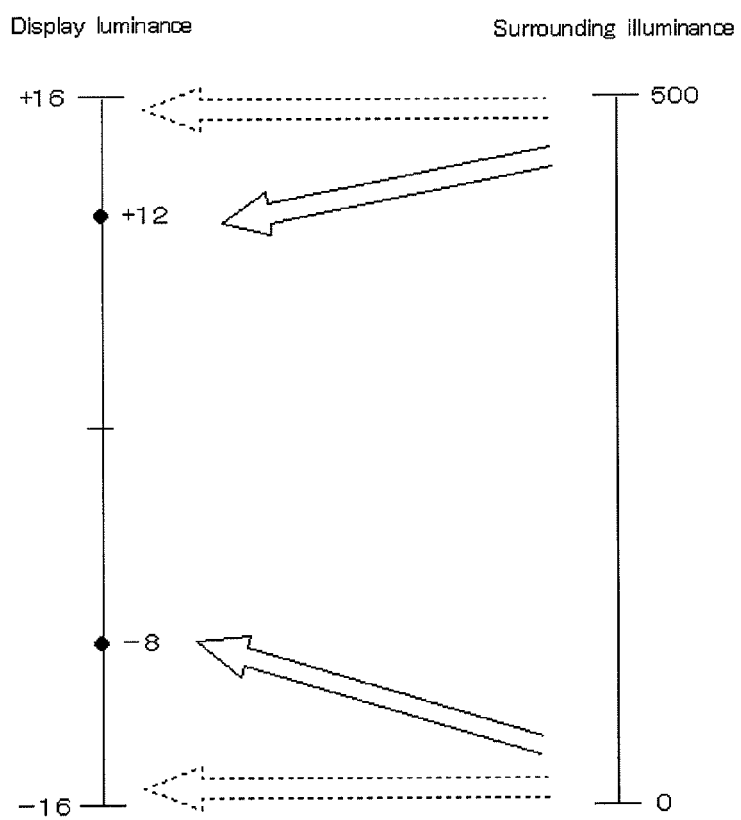
FIG. 5 is a diagram exemplifying a luminance range rule varied by a variation means for luminance range rule in the image display apparatus of the first embodiment.

FIG. 5 is a diagram exemplifying a luminance range rule varied by a variation means for luminance range rule in the image display apparatus of the first embodiment. As shown in FIG. 5, according to the luminance range rule, in cases where the surrounding illuminance is greater than 500 lux, the setting value of display luminance is '+16', and in cases where the surrounding illuminance is 0 lux, the setting value of display luminance is '−16'. Here, by means of the above user interface, the maximum value of the display luminance is set to '+12' and the minimum value is set to '−8', thereby varying the luminance range rule. Concretely speaking, this variation process of the predetermined rule is carried out, for example, by varying the numerical values of 'slope' or 'intercept' corresponding to the numerical values if the predetermined rule is a formula f(x) (i.e., f(x)=20/500x−8). Alternatively, if the predetermined rule is a rule indicated by database correlating the surrounding illuminance range and the setting value of display luminance, the variation process is carried out by updating setting value of the display luminance of the database.

Thus, if the variation in the variation unit for rule is a variation to the luminance range rule stored in the storing unit for luminance range rule, basically, it can be carried out just by specifying variation to the maximum and minimum values of the display luminance. Therefore, it becomes possible to simplify the input items of the user interface, thereby reducing the input items and the user's burden.

Note that this variation of the luminance range rule in the variation unit for rule is carried out as follows by means of hardware resources of the apparatus. At the outset, according to the user's operation, a program, which is for displaying a menu screen for various settings on the display, and for receiving variations of setting, is operated in the work area in the memory, and is executed by a central operational circuit, so that the menu screen as shown in FIG. 1 is displayed. Subsequently, in order to acquire the numerical value indicating the maximum and minimum values of the above luminance range respectively stored in a predetermined area of storage device such as a hard disk, information for specifying the respective storage areas, and for reading instructions. Therefore, the respective information indicating the above maximum value and minimum value are stored with the respective information indicating the addresses of the storage areas into the respective predetermined areas. Then, the respective values stored in the predetermined storage areas are displayed on the screen by the above program for displaying menu and for receiving setting variations.

Meanwhile, according to this program for displaying menu and for receiving setting variations, the receiving of input of the maximum and minimum values through the input device such as keyboard or button of remote control is awaited. Subsequently, the information of the values for updating the maximum and minimum values through the above input devices such as keyboard or button of remote control are inputted, and the inputted values are stored with respective information indicating addresses of the other storage areas into the other predetermined areas in the storage area of the memory. Subsequently, for example, when new numerical value is inputted for the maximum value, the maximum value stored in the storage area in the hard disk is overwritten with the inputted value stored in the predetermined area of the memory. Thus, updating of the predetermined rule is carried out.

<Processing Flow>

Figure 6:
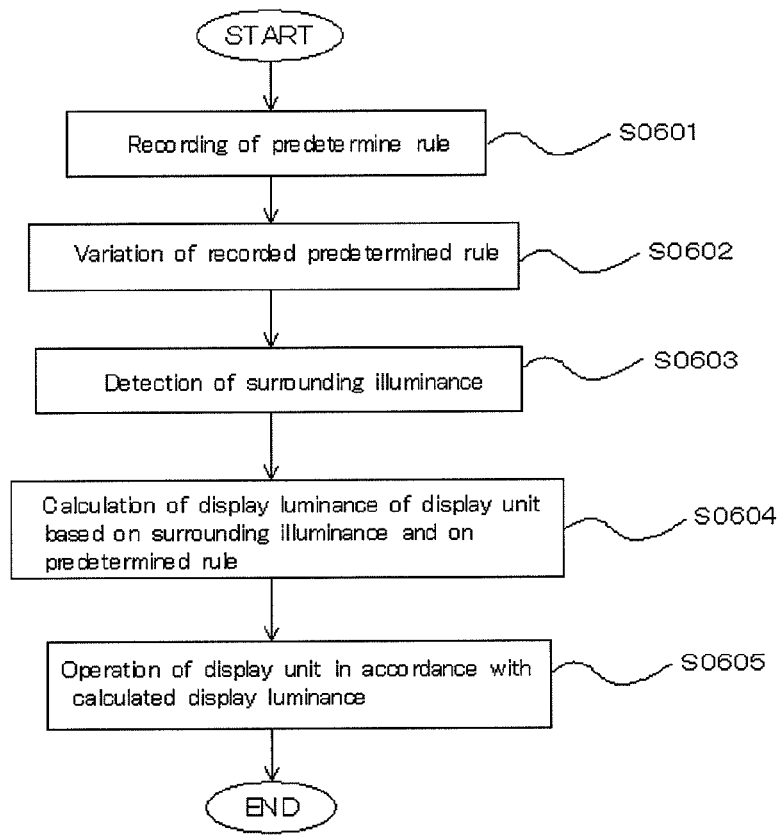
FIG. 6 is a flow chart showing processing flow of the image display apparatus of the first embodiment.

FIG. 6 is a flow chart showing the processing flow of the image display apparatus of the first embodiment. Note that the following steps may be processing steps for configuring a program, which is recorded in a medium to control a computer. As shown in FIG. 6, at the outset, the predetermined rule is recorded to be stored (step S0601). Subsequently, for example, when the values such as maximum value and minimum value of the luminance range are inputted by the user by means of the user interface, the predetermined rule recorded and stored in step S0601 is varied (step S0602). Subsequently, upon displaying the image on the image display apparatus, the surrounding illuminance is detected (step S0603), and if there is no variation, the display luminance of the display unit is calculated based on the predetermined rule recorded in step S0601, and on the surrounding illuminance detected in step S0603, and if there is variation in step S0602, the calculation is carried out based on the varied predetermined rule, and on the surrounding illuminance detected in step S0603 (step S0604). Finally, in accordance with the display luminance calculated in step S0604, the display unit is operated (step S0605), so that display of image at display luminance, which is adjusted to the surrounding illuminance of environment, and suits the user's taste, is carried out.

<Brief Description of Effects of First Embodiment>

As described above, according to the image display apparatus of the first embodiment, it becomes possible for a user to arbitrarily set, for example, the display luminance range adjusted based on the surrounding illuminance according to the user's taste or to eye-friendliness. Therefore, it becomes possible to carry out display of image at display luminance, which is adjusted to the surrounding illuminance of environment, and suitable for the user's taste.

Second Embodiment

<Concept of Second Embodiment>

An image display apparatus of a second embodiment is different from the first embodiment in that a plurality of predetermined rules are preliminarily stored as the 'predetermined rule' in EEPROM etc. in a selectable manner. Therefore, the user can easily enjoy the image, of which display luminance is adjusted to the display luminance suitable for the surrounding illuminance and for the content of image etc., just by selecting a rule he desires from a plurality of candidate rules such as a 'rule for movie', which is for adjusting display luminance suitable for a movie, and a 'rule for sports video', which is for adjusting display luminance suitable for a sports scene.

In addition, as to the variation of the predetermined rule in the variation unit for rule described in the first embodiment, setting of predetermined rule adjusted according to various contents of image etc. can be easily carried out by carrying out variation with respect to each plurality of candidate rules.

<Configuration of Second Embodiment>

Figure 15:
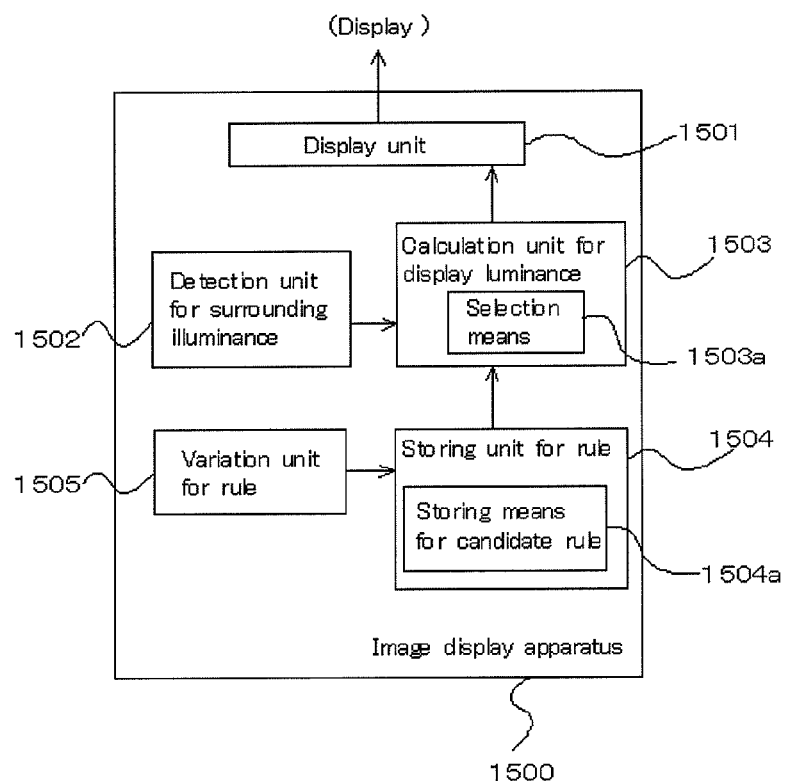
FIG. 15 is a functional block diagram of an image display apparatus of a second embodiment.

FIG. 15 is a functional block diagram of an image display apparatus of a second embodiment. As shown in FIG. 15, an 'image display apparatus' (1500) of the second embodiment comprises, a 'display unit' (1501), a 'detection unit for surrounding illuminance' (1502), a 'calculation unit for display luminance' (1503), a 'storing unit for rule' (1504), and a 'variation unit for rule' (1505). Additionally, although there is no illustration, the 'variation unit for rule' may further comprise an 'external input means', and a 'variation means for luminance range rule'. Note that the above 'display unit', the 'detection unit for surrounding illuminance', the 'calculation unit for display luminance', the 'storing unit for rule', the 'variation unit for rule', the 'external input means', and the 'variation means for luminance range rule' have been described in the first embodiment, so that descriptions are omitted. In the image display apparatus of a second embodiment, the storing unit for rule further comprises a 'storing unit for candidate rule' (1504a), and the calculation unit for display luminance further comprises a 'selection means' (1503a).

The 'storing means for candidate rule' (1504a) has a function of storing a plurality of candidate rules. This storing means for candidate rule can be implemented, for example, by local secondary storage device of the image display apparatus such as 'EEPROM', 'hard disk', 'phase-change optical disk media', 'nonvolatile memory'. Alternatively, this storing means for candidate rule is arranged in the server on the network, and a configuration, in which the image display apparatus of the second embodiment accesses the storing means for candidate rule on the server via the network, and the candidate rule is downloaded, may be used.

The 'candidate rule' is a rule utilized for calculation as a predetermined rule in the calculation unit for display luminance (1503), and examples of the rule set in accordance with the content of image include the 'rule for movie', the 'rule for sports video', and the 'rule for game'. Further, examples of the rule for movie include a 'rule for horror movie' and a 'rule for comedy movie'.

Based on such rules in accordance with the content of image, the image display apparatus of the second embodiment can easily display image at the display luminance in accordance with the surrounding illuminance and with the content of image, for example, just by acquiring identification information of the candidate rule selected by the user, or just by automatically acquiring identification information of the content of image.

Of course, the plurality of candidate rules are not limited to the above-mentioned candidate rules in accordance with contents of image, and may be a candidate rule with respect to each input interface for the image display apparatus such as 'rule for HDMI input terminal', 'rule for inputting PC', and 'rule for analog tuner'. Alternatively, candidate rules with respect to each broadcaster such as 'telecast station A' or 'telecast station B', candidate rules with respect to each broadcasting media such as 'BS digital/analog broadcasting' or 'terrestrial digital/analog broadcasting', and candidate rules with respect to each image quality standard such as 'HD (High-Definition) broadcasting' or 'SD (Standard-Definition) broadcasting' are also cited.

Figure 16:
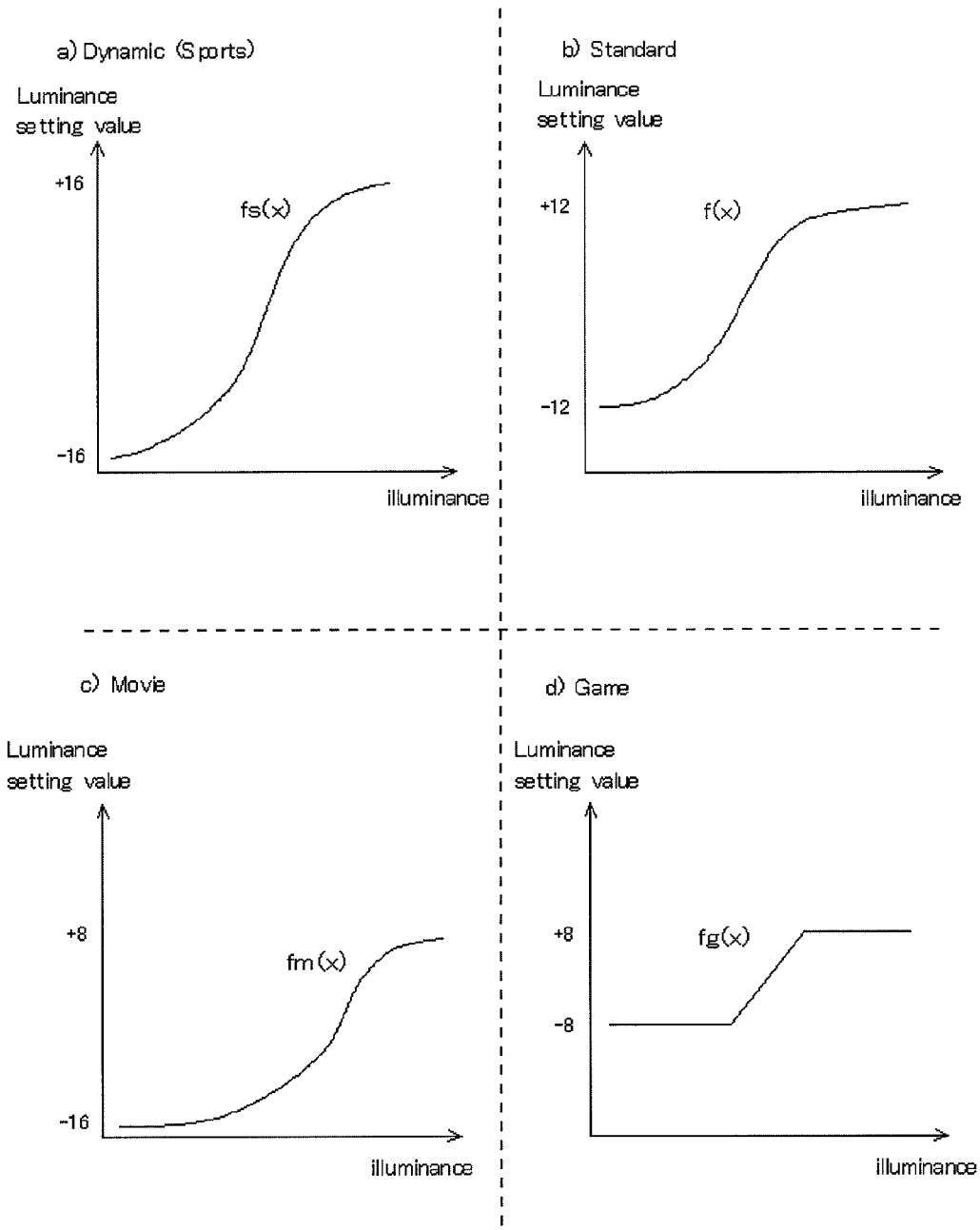
FIG. 16 is a conceptual diagram exemplifying a storing means for candidate rule of the image display apparatus of the second embodiment.

FIG. 16 is a conceptual diagram exemplifying candidate rules stored in a storing means for candidate rule of the image display apparatus of the second embodiment. As indicated by FIG. 16 (a), an example of the rule includes a rule for determining the maximum and minimum values of the display luminance in accordance with a type of content to be a display object. Concretely speaking, for example, as to a rule for 'dynamic mode' as the rule for sports video, range of luminance setting values in accordance with illuminance is '−16 to +16', and it is stored as a function fs(x) having a slope indicating strong contrast. Therefore, upon watching sports video, by utilizing this function, it becomes possible to adjust to display luminance, at which even a dynamic image is easily viewable.

Moreover, as indicated by FIG. 16(b), as to the rule for 'movie mode', for example, the range is '−16 to +8', and it is stored as a function fm(x) having a slope indicating a weak contrast. Therefore, it becomes possible to adjust to display luminance, at which the contrast is weak and dark image can easily be viewed. Moreover, as indicated by FIG. 16(d), as to the 'game mode', for example, the range is '−8 to +8, and it is stored as a function fg(x), having a slope indicating a weak contrast. Therefore, by utilizing this function, it becomes possible to adjust to display luminance to a level at which eyes do not become tired.

By utilizing such rules, it becomes possible to easily set the maximum and minimum values in the rule for determining the display luminance in accordance with surrounding illuminance just by selecting, for example, the dynamic mode, the movie mode, or the game mode.

Further, other than the above rules in accordance with the content of image, a rule in accordance with a type of received broadcast data to be a display object, with a type of output destination of content to be a display object, with a type of image quality standard of content to be a display object, or with one or more combination of them may be stored. Concretely speaking, for example, assuming that broadcast live of sports program is usually watched if the input terminal is the 'HDMI terminal 1', a configuration, in which a function as indicated by FIG. 16 (a) is stored as a candidate rule utilized for the calculation of the display luminance in the inputted image, may be used.

Of course, as described in the first embodiment, the above candidate rule can be arbitrarily varied by the user by means of the variation unit for rule or of the external input means. In addition, the candidate rule may be newly added and stored by an 'addition unit for new candidate rule' comprised in the image display apparatus other than the variation by the above variation unit for rule. Thus, the function of adding new candidate rule is equipped, so that it becomes possible for a service provider to provide a service such as network delivery of candidate rule adjusted by an expert.

In the image display apparatus of the second embodiment, the after-mentioned selection means selects a rule to be utilized as a predetermined rule from a plurality of candidate rules thus stored, and the calculation unit for display luminance calculates the actual display luminance.

The 'selection means' (1503a) has a function of selecting a rule to be utilized as the predetermined rule from the plurality of candidate rules stored in the storing means for candidate rule (1504a). For example, this selection means is implemented by a remote control, light-receiving unit of remote control, and an operation panel etc., and user selects ad inputs identification information of the candidate rule he desires by means of GUI etc., so that the rule is selected. Alternatively, a configuration, in which identification information of image input interface of the image to be displayed is automatically acquired, and a candidate rule is selected in accordance with the identification information of the image input source as indicated by FIG. 16 (b), may be used.

Further, the selection means may acquire one or more than one of a combination of a type of content to be a display object, a type of received broadcast data to be a display object, control information of displayed content correlated with the content to be a display object, and control information of displayed broadcast data correlated with the received broadcast data to be a display object, thereby carrying out the selection in accordance with the information of the acquired one or more than one combination. The 'type of content' is information indicating a type of content of the image such as a horror movie, comedy movie, sports video, news video, or game video. In addition, the 'type of received broadcast data' includes the type of broadcasting media such as 'BS digital/analog broadcasting' or 'terrestrial digital/analog broadcasting', or the type of broadcaster such as 'telecast station (channel) A' or 'telecast station B'. The 'control information of displayed content' and the 'control information of displayed broadcast data' are instruction information for controlling the image display apparatus in accordance with the type of content or the type of received broadcast data Therefore, in the case of image acquired by reproducing a media such as DVD, the identification information regarding the genre of the image such as 'movie' or 'sports' is written in read-in area of the DVD media, and the image display apparatus of the second embodiment acquires the 'type of content', thereby selecting candidate rule in accordance with the type of content as indicated by FIG. 16 (a). Further, in the case of image of digital broadcast wave, 'type of content' described in BML (Broadcast Markup Language) format in data portion included in the digital broadcast wave may be automatically acquired, so that the candidate rule is similarly selected in accordance with the type of content.

FIG. 17 is a conceptual diagram exemplifying data portion of the above digital broadcast wave. As shown in FIG. 17, the data portion of the digital broadcast wave is configured by 'header', 'resource list', and 'BML document' as main portion of data etc., and genre information of the broadcast etc. as the 'type of content' is described in the 'BML document'. Of course, information described here may be information indicating type of received broadcast data such as 'BS digital broadcasting', 'terrestrial digital broadcasting', or 'CS digital broadcasting', or may be the control information of displayed content and the control information of displayed broadcast data for controlling the image display apparatus of the second embodiment in accordance with the above types.

As described above, according to the image display apparatus of the second embodiment, it becomes possible to select a rule for calculating the display luminance in accordance with the surrounding illuminance by utilizing a candidate rule the user desires, or a candidate rule in accordance with the automatically acquired type of content etc. selected from a plurality of candidate rules.

Moreover, the image display apparatus of the second embodiment may further comprise 'acquisition unit for information of object in image', and the 'calculation unit for display luminance' may comprise a 'calculation means for display luminance with respect to each object'. According to this, for example, processing, in which information of object in the image such as a person or a background is acquired by means of visual feature description tool etc. of MPEG7, and the display luminance is calculated, so that the central object such as a person looks brighter than background object, becomes possible.

<Hardware Configuration of Second Embodiment>

Figure 18:
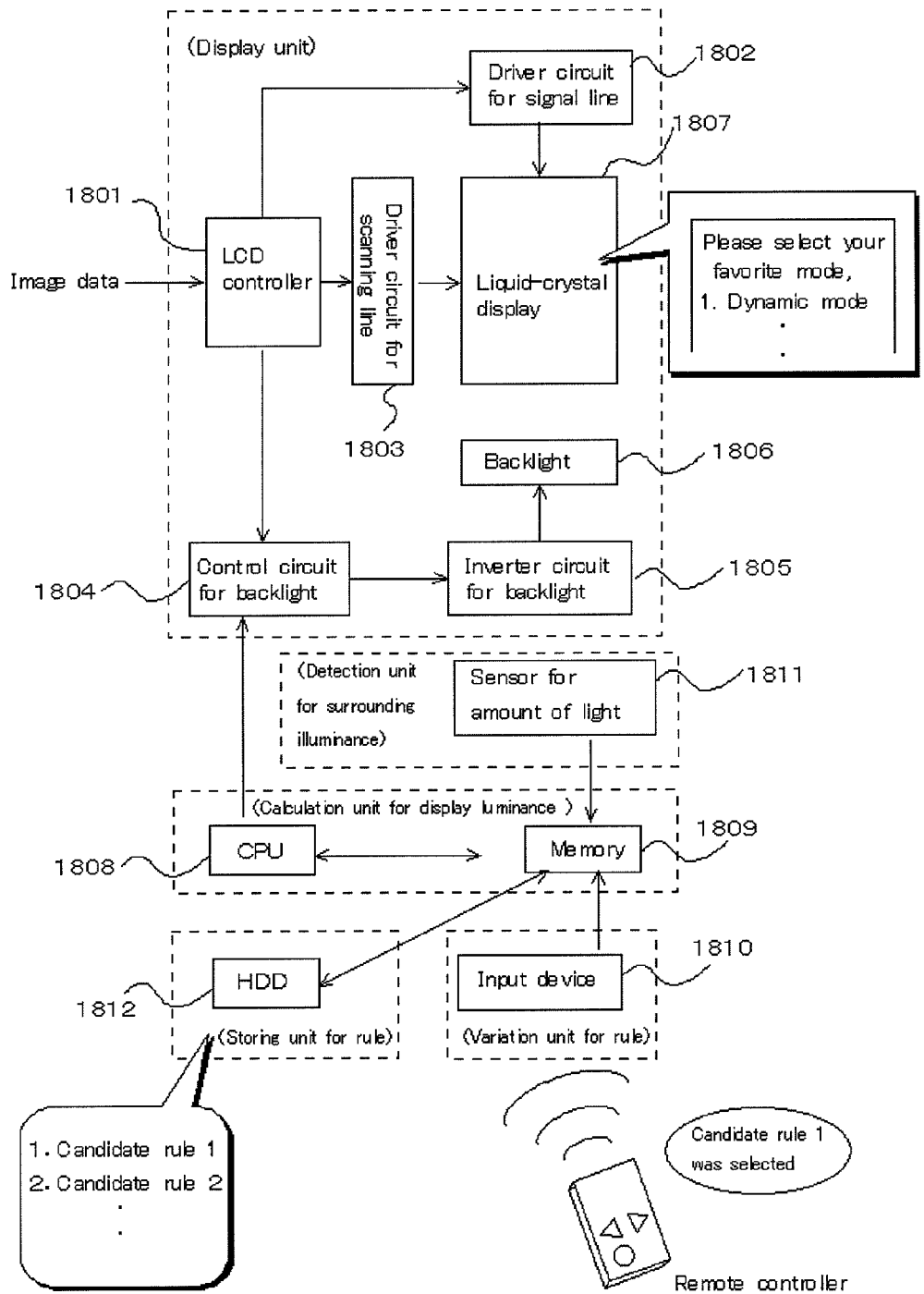
FIG. 18 is a diagram exemplifying the hardware configuration of the image display apparatus of the second embodiment.

FIG. 18 is a diagram exemplifying hardware configuration of the image display apparatus of the second embodiment when the functional respective components are implemented as hardware. By means of FIG. 18, operation of the respective hardware components in adjustment of display luminance will be described taking a liquid-crystal display as a display unit for example.

At the outset, the image data to be displayed on the display including RGB signal, vertical and horizontal synchronizing signals, and time information is inputted in a LCD controller (1801). The LCD controller outputs signal line control signal including RGB signal to a signal line driving circuit (1802) based on the inputted image data. Further, scanning line control signal is outputted to a scanning line driving circuit (1803), and image display in a liquid-crystal display (1807) is carried out.

Further, in a hard disk drive (HDD: 1812), a plurality of candidate rules are stored, and any one of them is stored in a predetermined area in a memory (1809) as a predetermined rule. Subsequently, a value indicating the surrounding illuminance measured by a sensor for amount of light (1811) is stored in another predetermined area in the memory. After that, a program for controlling luminance is operated on a CPU (1808) and is executed, so that display luminance value is calculated by four arithmetic operations by means of the values indicating the predetermined rule and the surrounding illuminance. Subsequently, based on the calculated display luminance value, the LCD controller controls an inverter circuit (1805) for backlight to adjust driving power via a backlight control circuit (1804), thereby adjusting backlight luminance of a backlight (1806).

Here, menu indication signal is outputted from the input device by pressing a menu indication button of an input device (1810). Subsequently, by receiving this menu indication signal, GUI for selecting candidate rule is indicated on the display, for example, by OSD processing. Subsequently, the user operates the remote control watching the GUI, selects a candidate rule he desires, for example, 'rule for movie', and presses the input button. Therefore, the image display apparatus receiving the selection signal by the 'input device' reads a predetermined function fm(x) etc. as a corresponding candidate rule from the 'HDD', and stores it as a predetermined rule into a predetermined address in the 'memory'.

Alternatively, by automatically acquiring the 'type of content' etc., recorded in the digital broadcast wave received by a 'tuner', not indicated, or in the read-in area of a DVD media put in a 'DVD drive', the corresponding candidate rule may be read from the 'HDD', and may be stored into the predetermined address in the 'memory'.

Subsequently, the value indicating the surrounding illuminance measured by the sensor for amount of light is also stored in another predetermined area in the storage area of the memory. Subsequently, by calculation in CPU, the setting value of the display luminance is calculated based on the predetermined rule fm(x) stored in the predetermined area in the memory, and on the value indicating the surrounding illuminance. Subsequently, luminance control of the backlight based on the calculated setting value of the display luminance is carried out, thereby carrying out image display at the luminance based on the surrounding illuminance and on the predetermined rule selected from the candidate rules. Note that in the second embodiment, although control of the luminance is carried out by controlling the luminance of the backlight, of course, it is not limited to the above, and may be various luminance controls such as a luminance control, in which a slope indicating gamma characteristic of the liquid-crystal panel is controlled to be the calculated setting value of display luminance, or a luminance control by varying an luminance value of image data.

<Processing Flow>

Figure 19:
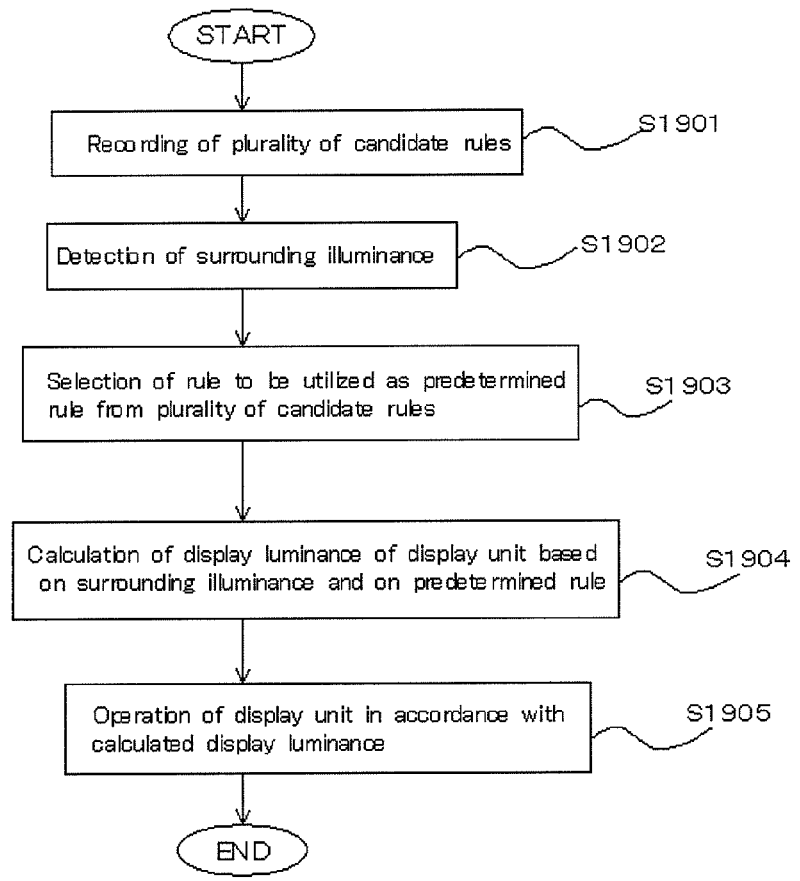
FIG. 19 is a flow chart showing the processing flow of the image display apparatus of the second embodiment.

FIG. 19 is a flow chart showing the processing flow of the image display apparatus of the second embodiment. Note that the following steps may be processing steps for configuring a program, which is recorded in a medium to control a computer. As shown in FIG. 19, at the outset, a plurality of candidate rules are recorded to be stored (step S1901). After that, for example, if variation information is inputted with respect to each candidate rule by the user by means of the user interface, the candidate rule recorded and stored in step S1901 is varied and is recorded.

Subsequently, upon displaying the image on the image display apparatus, the surrounding illuminance is detected (step S1902). Subsequently, a rule to be utilized as a predetermined rule is selected from the candidate rules recorded in step S1901 (step S1903). Note that, in the selection, one or more than one of a combination of a type of content to be a display object, a type of received broadcast data to be a display object, control information of displayed content correlated with the content to be a display object, and control information of displayed broadcast data correlated with the received broadcast data to be a display object may be acquired, thereby carrying out the selection in accordance with the information of the acquired one or more than one combination. Subsequently, calculation of the display luminance of the display unit is carried out based on the surrounding illuminance detected in step S1902, and on the rule selected as the predetermined rule in step S1903 (step S1904). Finally, in accordance with the display luminance calculated in step S1904, the display unit is operated (step S1905), so that display of image at the display luminance, which is adjusted to the surrounding illuminance of environment, and suits the content, is carried out.

<Brief Description of Effects of Second Embodiment>

As described above, according to the image display apparatus of the second embodiment, it becomes possible to select a rule for calculating the display luminance in accordance with the surrounding illuminance by means of a candidate rule user desires, or of a candidate rule in accordance with a type of content automatically acquired from a plurality of candidate rules.

Third Embodiment

<Concept of Third Embodiment>

The image display apparatus of the third embodiment is different from the first embodiment in that the variation of the maximum and minimum values of the rule stored as the luminance range rule is restricted in accordance with the surrounding illuminance. Concretely speaking, for example, if the surrounding illuminance of environment is above the standard, the image display apparatus adjusts the display luminance to be brighter, and sets only the maximum value without setting of the minimum value. Thus, the variation of the luminance range rule is restricted in accordance with the surrounding illuminance, thereby reducing the input items according to the condition of illuminance, and the user's unnecessary burden. In addition, this enables reduction of display items in the user interface, and the small number of items enables variation of setting of rule without making the user conscious of operation.

<Configuration of Third Embodiment>

Figure 7:
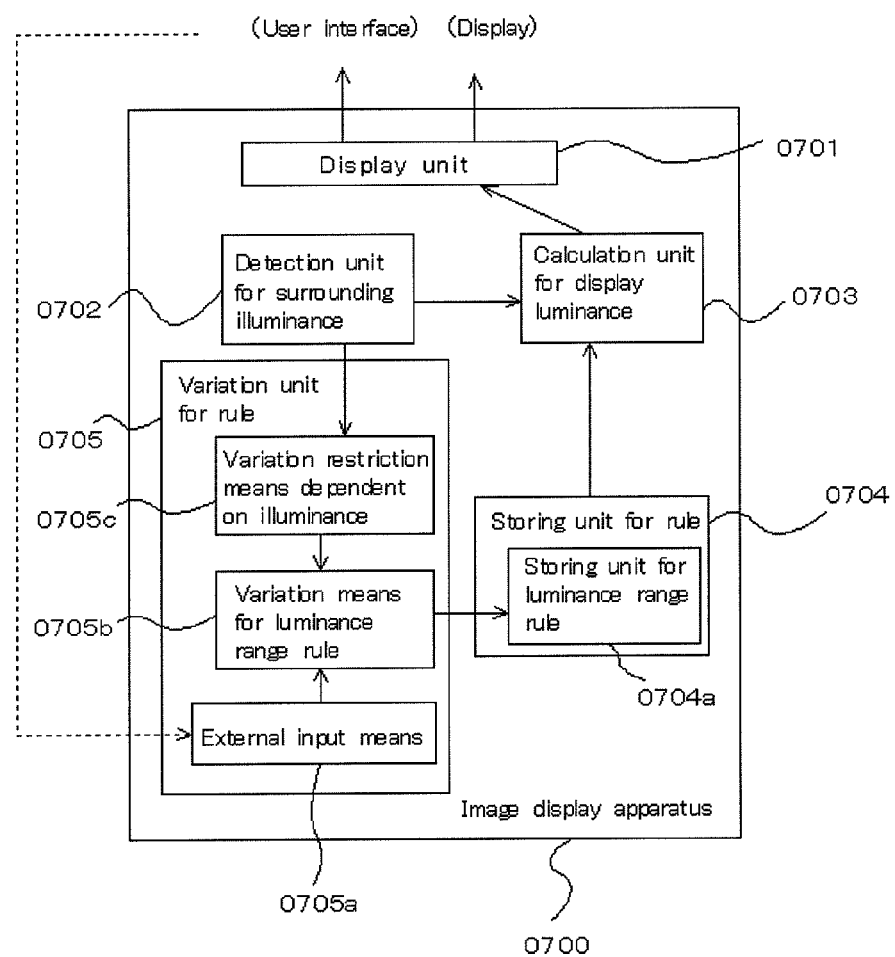
FIG. 7 is a functional block diagram of an image display apparatus of a third embodiment.

FIG. 7 is a functional block diagram of an image display apparatus of a third embodiment. As shown in FIG. 7, an 'image display apparatus' (0700) of the third embodiment comprises, a 'display unit' (0701), a 'detection unit for surrounding illuminance' (0702), a 'calculation unit for display luminance' (0703), a 'storing unit for rule' (0704), and a 'variation unit for rule' (0705). Additionally, the 'variation unit for rule' may further comprise an 'external input means' (0705a), and a 'variation means for luminance range rule' (0705b). Note that the above 'display unit', the 'detection unit for surrounding illuminance', the 'calculation unit for display luminance', the 'storing unit for rule', the 'variation unit for rule', the 'external input means', and the 'variation means for luminance range rule' have been described in the above embodiment, so that descriptions are omitted. In the image display apparatus of a third embodiment, the variation unit for rule further comprises a 'variation restriction means dependent on illuminance' (0705c).

The 'variation restriction means dependent on illuminance' (0705c) has a function of restricting the variation by the variation means for luminance range rule (0705b) in accordance with the surrounding illuminance detected by the detection unit for illuminance (0702). Examples of this restriction on variation include a restriction, in which if the surrounding illuminance is above a predetermined illuminance, only the maximum value included in a storing means for luminance range rule (0704a) is variable, or a restriction, in which if the surrounding illuminance is below a predetermined illuminance, only the minimum value included in the storing means for luminance range rule is variable.

Figure 8:
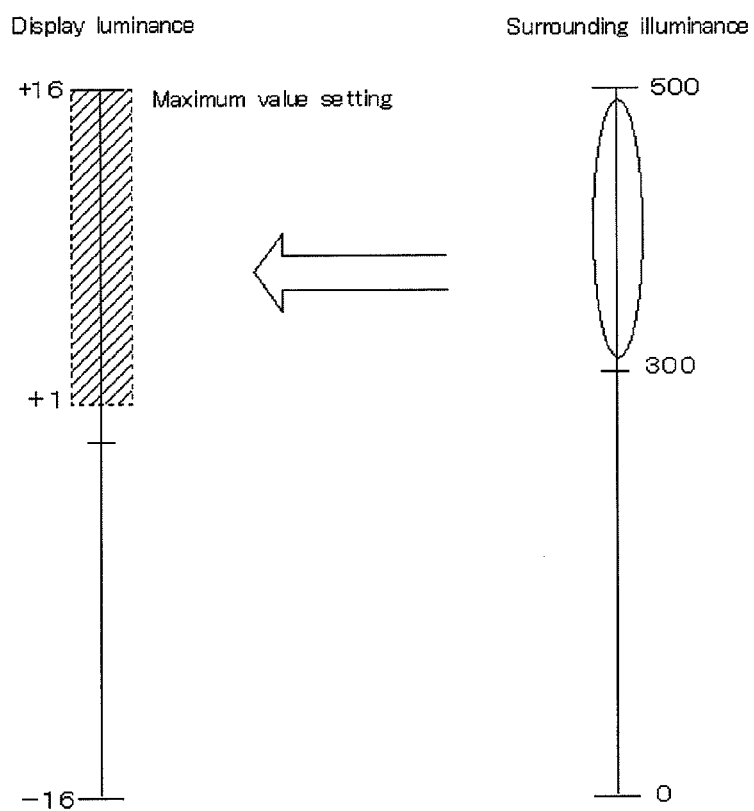
FIG. 8 is a conceptual diagram exemplifying a restriction on variation of the maximum value of the display luminance in accordance with the surrounding illuminance by the variation restriction means dependent on illuminance in the image display apparatus of the third embodiment.

FIG. 8 is a conceptual diagram exemplifying a restriction on variation of the maximum value of the display luminance in accordance with the surrounding illuminance by the variation restriction means dependent on illuminance. As shown in FIG. 8, in cases where the surrounding illuminance detected in the detection unit for surrounding illuminance is, for example, above 300 lux, the surrounding illuminance of the environment is sufficiently bright, so that the necessity of adjustment of the display luminance to minus value, and the variation of the minimum value can be omitted, thereby being restricted. Consequently, only the maximum value is varied, so that the setting value of the maximum value is variable within the range of '+1' to '+16'.

Figure 9:
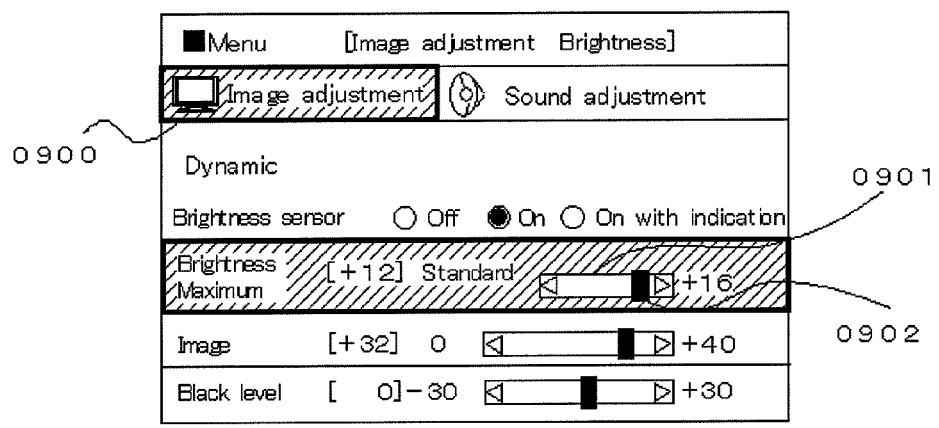
FIG. 9 is a diagram exemplifying a display screen of the user interface in the image display apparatus of the third embodiment.

Further, in such case where the restriction in accordance with the surrounding illuminance is carried out, for example, the following configuration as a user interface for varying only the maximum value of the display luminance is cited. Therefore, it is a user interface comprising an input bar indicator for indicating an input bar indicating only the setting range of the maximum value as an input screen in cases where the surrounding illuminance is above the predetermined illuminance. The 'input bar' has a configuration, for example, in which there is a bar indicating the setting range by its length, and the desired value is specified by sliding a control on the bar up and down or right and left. FIG. 9 is a diagram exemplifying a display screen of the user interface. As shown in FIG. 9, when a tab of an item 'image adjustment' (0900) is specified, a slider bar as an 'input bar' (0901) for adjusting brightness is displayed on a display by an 'input bar indicator' (not shown). The user can specify the maximum value of the display luminance he desires by moving a control (0902) for varying the maximum value right and left. Further, this input bar is characterized in that if the surrounding illuminance is sufficiently bright, as shown in FIG. 9, the input bar for varying the minimum value of the display luminance is omitted.

Figure 10:
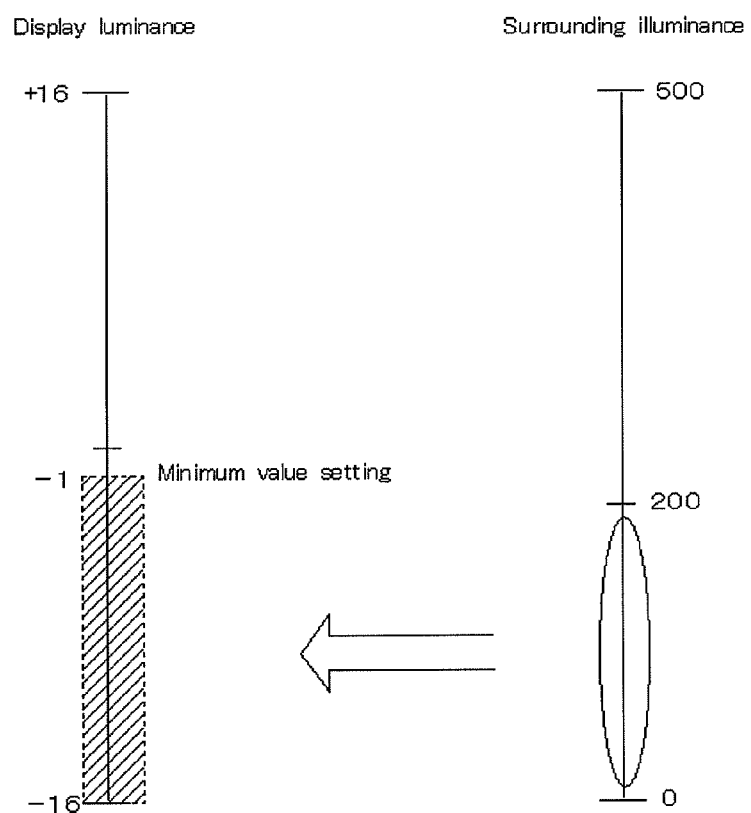
FIG. 10 is a conceptual diagram exemplifying another restriction on variation of the maximum value of the display luminance in accordance with the surrounding illuminance by the variation restriction means dependent on illuminance in the image display apparatus of the third embodiment.

Of course, contrary to the above example, the restriction may be a restriction, in which if the surrounding illuminance is below a predetermined illuminance, only the minimum value included in the storing means for luminance range rule is variable. FIG. 10 is a conceptual diagram exemplifying another restriction on variation of the maximum value of the display luminance in accordance with the surrounding illuminance by the variation restriction means dependent on illuminance. As shown in FIG. 10, in cases where the surrounding illuminance detected in the detection unit for surrounding illuminance is, for example, above 200 lux, the surrounding illuminance of the environment is dark, so that the necessity of adjustment of the display luminance to plus value, and the variation of the maximum value can be omitted, thereby being restricted. Consequently, only the minimum value is varied, so that the setting value of the minimum value is variable within the range of '−16' to '−1'.

Figure 11:
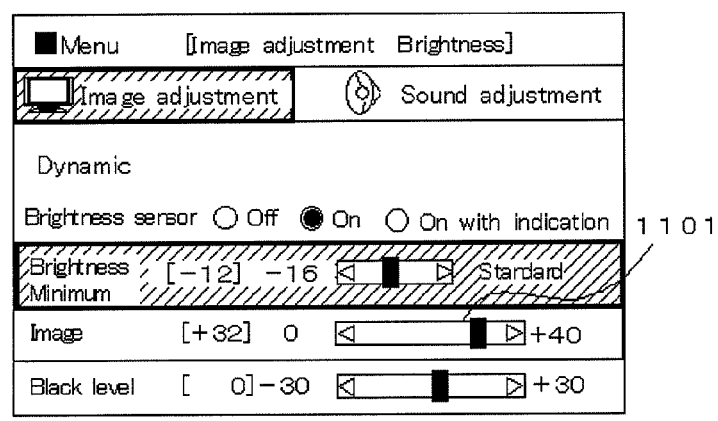
FIG. 11 is a diagram exemplifying another display screen of the user interface in the image display apparatus of the third embodiment.

As a user interface in such case, a user interface comprising an input bar indicator for indicating an input bar indicating only the setting range of the minimum value as an input screen in cases where the surrounding illuminance is below the predetermined illuminance may be used. FIG. 11 is a diagram exemplifying another display screen of the user interface comprising an input bar indicator for indicating an input bar indicating only the setting range of the minimum value. As shown in FIG. 11, this input bar is characterized in that the input bar for varying the maximum value of the display luminance is omitted, and only the input bar for varying the minimum value of the display luminance is indicated.

As described above, the variation of the luminance range rule is restricted in accordance with the surrounding illuminance, thereby reducing the input items according to the illuminance condition of environment, and the user's unnecessary burden. In addition, this enables reduction of display items in the user interface, and the small number of items enables variation of setting of rule without making the user conscious of operation.

<Processing Flow>

Figure 12:
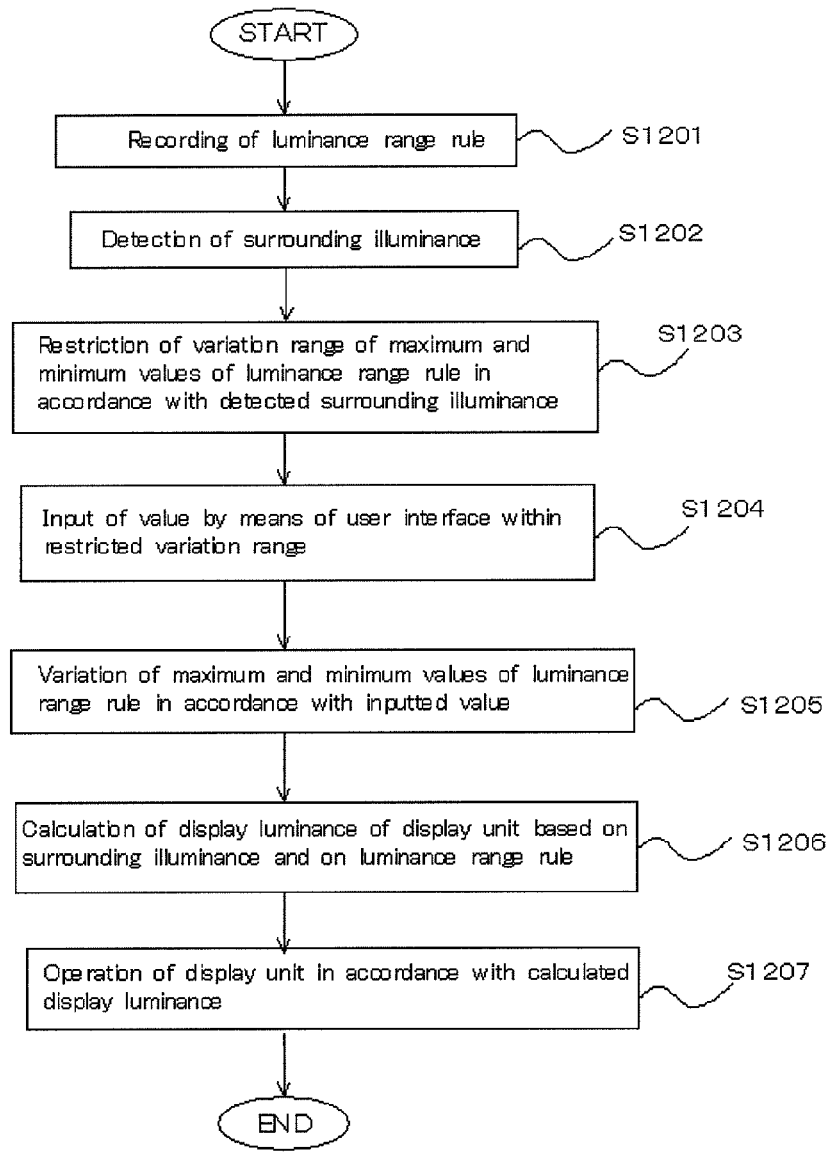
FIG. 12 is a flow chart showing processing flow of the image display apparatus of the third embodiment.

FIG. 12 is a flow chart showing processing flow of the image display apparatus of the third embodiment. Note that the following steps may be processing steps for configuring a program, which is recorded in a medium to control a computer. As shown in FIG. 12, at the outset, luminance range rule is recorded to be stored (step S1201). After that, upon displaying the image on the image display apparatus, the surrounding illuminance is detected (step S1202). Subsequently, the variation range of the maximum or the minimum value of the luminance range rule is restricted in accordance with the surrounding illuminance detected in step S1202 (step S1203). Subsequently, within the restricted variation range in step S1203, when the value is inputted by means of the user interface (step S1204), in accordance with the inputted value, the maximum or the minimum value of the luminance range rule recorded in step S1201 is varied (step S1205). Subsequently, if there is no variation, the display luminance of the display unit is calculated based on the luminance range rule recorded in step S1201, and on the surrounding illuminance detected in step S1202, and if there is variation in step S1205, the calculation is carried out based on the varied luminance range rule, and on the surrounding illuminance detected in step S1202 (step S1206). Finally, in accordance with the display luminance calculated in step S1206, the display unit is operated (step S1207), so that display of image at display luminance, which is adjusted to the surrounding illuminance of environment, and suits the user's taste, is carried out.

Of course, the processing flow of the third embodiment may be a processing flow, in which step S1203 (the step, in which the variation range of the maximum or the minimum value of the luminance range rule is restricted in accordance with the surrounding illuminance), step S1204, and step S1205 (the step, in which the luminance range rule is varied by acquiring the value by means of the user interface) etc. of the above processing flow are excluded.

In this case, at the outset, luminance range rule for determining the maximum and the minimum value of the display luminance in accordance with the surrounding illuminance is recorded to be stored. After that, for example, if the value inputted by the user by means of the user interface on the display unit is acquired, the maximum and the minimum value determined by the luminance range rule, which has been recorded and stored, based on the inputted value may be varied and recorded. Further, in the variation of the luminance range rule, for example, the surrounding illuminance is detected by a sensor, and in accordance with the detected surrounding illuminance, the variation may be restricted. Further, the restriction may have a configuration, in which if the detected surrounding illuminance is above a predetermined illuminance, only the maximum value included in the storing means for luminance range rule is variable, and if the detected surrounding illuminance is below a predetermined illuminance, only the minimum value included in the storing means for luminance range rule is variable. Further, as a user interface of the display unit for enabling the variation in accordance with the restriction, a user interface may have a configuration, in which an input bar indicating only the setting range of the maximum value as an input screen, or an input bar indicating only the setting range of the minimum value as an input screen is indicated, thereby acquiring the value inputted by means of the displayed user interface.

After that, upon displaying the image on the image display apparatus, the surrounding illuminance is detected. Subsequently, the display luminance of the display unit is calculated based on the luminance range rule, and on the detected surrounding illuminance. Finally, in accordance with the calculated display luminance, the display unit is operated.

<Brief Description of Effects of Third Embodiment>

As described above, according to the image display apparatus of the third embodiment, it becomes possible to reduce the input items according to the illuminance condition of environment, and the user's unnecessary burden. In addition, this enables reduction of display items in the user interface, and the small number of items enables variation of setting of rule without making the user conscious of operation.

Fourth Embodiment

<Concept of Fourth Embodiment>

The image display apparatus of the fourth embodiment is based on the image display apparatus comprising the storing means for luminance range rule of the first or second embodiment. The image display apparatus of the fourth embodiment has a function, in which, as shown in FIG. 9 or 11, the control of the input bar of the user interface is moved to the left, so that the movement is reflected in real-time on the display luminance of the image display, and the screen gradually becomes dark. Thus, the variation of setting of the maximum and minimum values of the display luminance is reflected in real-time on the display luminance of the display, so that the user can set the maximum and minimum values monitoring the actual display luminance.

<Configuration of Fourth Embodiment>

Figure 13:
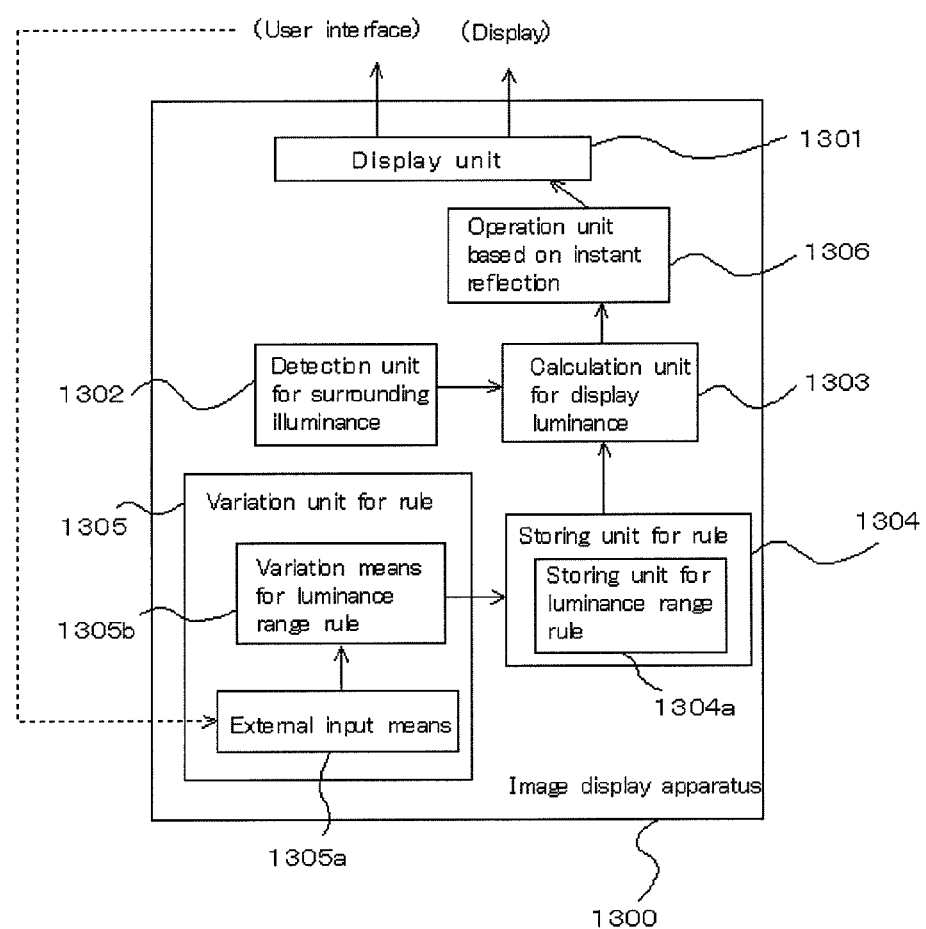
FIG. 13 is a functional block diagram of an image display apparatus of a fourth embodiment.

FIG. 13 is a functional block diagram of an image display apparatus of a fourth embodiment. As shown in FIG. 13, an 'image display apparatus' (1300) of the fourth embodiment comprises, a 'display unit' (1301), a 'detection unit for surrounding illuminance' (1302), a 'calculation unit for display luminance' (1303), a 'storing unit for rule' (1304), and a 'variation unit for rule' (1305). Additionally, the 'variation unit for rule' may further comprise an 'external input means' (1305a), and a 'variation means for luminance range rule' (1305b). Note that, although it is not shown, based on the third embodiment, a 'variation restriction means dependent on illuminance' may be further comprised.

In addition, the image display apparatus of a fourth embodiment further comprises an 'operation unit based on instant reflection' (1306). The 'operation unit based on instant reflection' (1306) has a function of operating the display unit displaying the user interface screen based on the display luminance value calculated in accordance with the rule varied based on the inputted value through the external input means. By this operation at the display luminance calculated in accordance with varied rule, the setting of the luminance range rule monitoring the actual variation of luminance becomes possible, so that the user can set the range according to the value suitable for his taste.

<Processing Flow>

The processing of the fourth embodiment including the operation step based on instant reflection, which is for operating the display unit displaying the user interface screen based on the display luminance value calculated in accordance with the rule varied based on the inputted value through the external input means, in addition to the above processing of the third embodiment.

Concretely speaking, for example, similar to the processing of the third embodiment, at the outset, luminance range rule for determining the maximum and the minimum value of the display luminance in accordance with the surrounding illuminance is recorded to be stored. After that, for example, if the value inputted by the user by means of the user interface on the display unit is acquired, the maximum and the minimum value determined by the luminance range rule, which has been recorded and stored, based on the inputted value may be varied.

After that, in order to instantly reflect the above variation of the display luminance rule on the display luminance of the display, the surrounding illuminance is detected, and the display luminance of the display unit is calculated based on the detected surrounding illuminance, and on the luminance range rule. Subsequently, in accordance with the calculated display luminance, the display unit displaying the screen of the user interface is operated, thereby carrying out the processing of instantly reflecting on the display luminance in accordance with the variation.

<Hardware Configuration of Fourth Embodiment>

Figure 14:
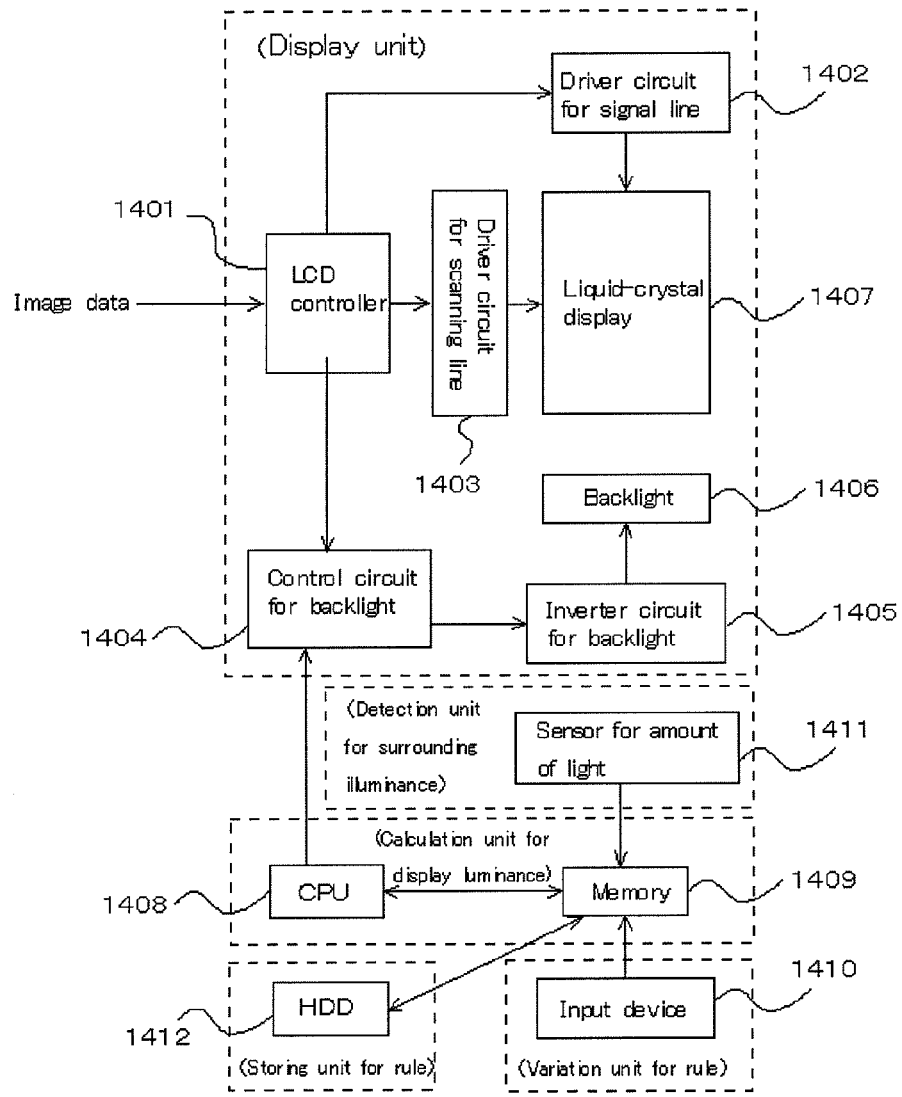
FIG. 14 is a diagram showing overall processing flow of adjusting luminance in the image display apparatus of the present invention.

At the outset, the image data to be displayed on the display including RGB signal, vertical and horizontal synchronizing signals, and time information is inputted in a LCD controller (1401). As shown in FIG. 14, the LCD controller outputs signal line control signal including RGB signal to a signal line driving circuit (1402) based on the inputted image data. Further, scanning line control signal is outputted to a scanning line driving circuit (1403), and image display in a liquid-crystal display (1407) is carried out. Further, as described in the first embodiment, in a hard disk drive (HDD: 1412), predetermined rule is stored in a predetermined area in a memory (1409). Subsequently, value indicating the surrounding illuminance measured by a sensor for amount of light (1411) is stored in another predetermined area in the memory. Subsequently, a program for controlling luminance is operated on a CPU (1408) and is executed, so that display luminance value is calculated by four arithmetic operations by means of the values indicating the predetermined rule and the surrounding illuminance. Subsequently, based on the calculated display luminance value, the LCD controller controls an inverter circuit (1405) for backlight to adjust driving power via a backlight control circuit (1404), thereby adjusting backlight luminance of a backlight (1406).

Here, menu indication signal is outputted from the input device by pressing a menu indication button of an input device (1410). Subsequently, by receiving this menu indication signal, as described above, a program for displaying menu and for receiving variation of setting is operated in the work area in the memory (1409), and is executed by CPU (1408). Consequently, the menu screen as shown in FIG. 1 is displayed. Further, the respective information indicating the above maximum value and minimum value are stored with the respective information indicating the addresses of the storage areas into the respective predetermined areas, and the respective values are displayed on the menu screen. Further, the value indicating the surrounding illuminance measured by the sensor for amount of light is also stored in another predetermined area in the storage area of the memory.

In addition, when operation for moving the control for setting the maximum value as shown in FIG. 1 is carried out through the input device, the value indicating the setting value in accordance with the movement position of the control is acquired and is stored in the predetermined area of the memory. Here, in the CPU, the program for controlling backlight luminance is executed, and the setting value of the display luminance is calculated by operation of CPU based on the setting value in accordance with the movement position of the control stored in the predetermined area of the memory, and on the value indicating the surrounding illuminance.

Further, in the case of the image display apparatus of the fourth embodiment, the luminance control of the backlight based on the calculated display luminance is carried out according to the movement of the control in real-time. Of course, it is not necessary to carry out calculation of the display luminance value and the control of the backlight in real-time upon the movement of the control, and the configuration, in which the program for controlling backlight luminance is executed by receiving and entry signal indicating that a button for determining the setting of the menu screen is pressed by means of the input device, may be used. Therefore, the maximum and minimum values, which have been finally inputted and determined, and stored in the predetermined are in the storage area of the memory with the information indicating the addresses are used for updating the maximum and minimum values, which have been set before, and been stored in the predetermined area of the memory, thereby varying the predetermined rule. Subsequently, upon watching image, by means of the maximum and minimum values etc., which have been arbitrarily varied and set by the user, the image display at the luminance controlled by the program for controlling backlight luminance is carried out. Note that in the second embodiment, although control of the luminance is carried out by controlling the luminance of the backlight, of course, it is not limited to the above, and may be various luminance controls such as luminance control, in which a slope indicating gamma characteristic of the liquid-crystal panel is controlled to be the calculated setting value of display luminance, or a luminance control by varying an luminance value of image data.

Fifth Embodiment

<Concept of Fifth Embodiment>

The image display apparatus of the fifth embodiment is based on the image display apparatus comprising the storing means for luminance range rule of the first to fourth embodiments. In the image display apparatus of the fifth embodiment, for example, when the setting of the luminance range rule by means of the user interface as shown in FIG. 9 or 11 is carried out, power supply to the 'sensor for amount of light' etc. as the detection unit for illuminance is stopped, and the function is turned off, thereby effectively saving energy.

Note that in cases where the function of the sensor for amount of light is turned off, an adjustment of the display luminance upon setting of the luminance range rule by means of the user interface may not be carried out. Alternatively, by means of the value, which has been detected just before the turning off of the function of the sensor for amount of light, the image display luminance may be adjusted in real-time according to the movement of the control by the processing of the 'operation unit based on instant reflection' described in the fourth embodiment.

<Configuration of Fifth Embodiment>

Figure 20:
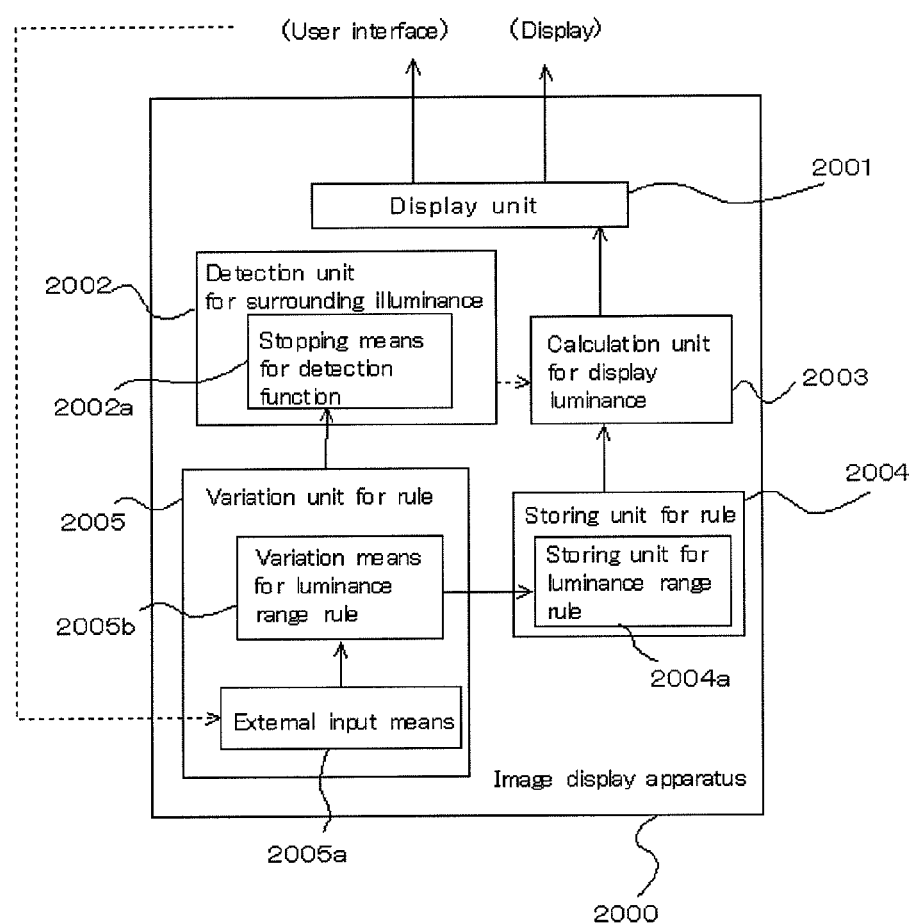
FIG. 20 is a functional block diagram of an image display apparatus of a fifth embodiment.

FIG. 20 is a functional block diagram of an image display apparatus of a fifth embodiment. As shown in FIG. 20, an 'image display apparatus' (2000) of the fifth embodiment based on the image display apparatus of the first embodiment comprising the storing means for luminance range rule comprises, a 'display unit' (2001), a 'detection unit for surrounding illuminance' (2002), a 'calculation unit for display luminance' (2003), a 'storing unit for rule' (2004), and a 'variation unit for rule' (2005). Additionally, the storing unit for rule may further comprise a 'storing means for luminance range rule' (2004a). Additionally, the 'variation unit for rule' may further comprise an 'external input means' (2005a), and a 'variation means for luminance range rule' (2005b). Note that, although it is not indicated, based on the third and fourth embodiments, a 'storing means for candidate rule', a 'selection means', and a 'variation restriction means dependent on illuminance' may be further comprised.

In addition, the image display apparatus of the fifth embodiment is characterized in that the 'detection unit for surrounding illuminance' further comprises a 'stopping means for detection function' (2002a).

The 'stopping means for detection function' (2002a) has a function of turning off detection of illuminance in cases where the varying process of the information for determining luminance range in the rule stored in the storing unit for rule is carried out based on the input from the external input means (2005a). This 'turning off detection of illuminance' may be carried out by various methods such as a turning off the detection function of illuminance by stopping the power supply to the sensor for amount of light as described above, or a turning off the detection function of illuminance by blanketing the sensor for amount of light.

Further, the adjustment of the display in the display unit in cases where the detection function of illuminance is turned off by this 'stopping means for detection function' may be carried out by a configuration as described above, in which an adjustment of the display luminance upon setting of the luminance range rule by means of the user interface is not carried out, or by a configuration, in which by means of the value, which has been detected just before the turning off of the function of the sensor for amount of light, the image display luminance may be adjusted in real-time according to the movement of the control by the processing of the 'operation unit based on instant reflection' described in the fourth embodiment.

Note that this 'stopping means for detection function' may be implemented by a hardware configuration such as 'CPU' for receiving display signal etc. of 'GUI for setting luminance range rule' from the external input means, and 'control circuit for power supply' for receiving an instruction of stopping power supply to the sensor for amount of light, which has been outputted from the 'CPU' in accordance with the reception of the display signal, and for controlling the power supply. Subsequently, when the 'CPU' receives a signal indicating completion of setting and display of the GUI for setting luminance range rule from the external input means, an instruction of starting power supply to the sensor for amount of light is outputted, thereby turning on the detection function of illuminance.

<Processing Flow>

Figure 21:
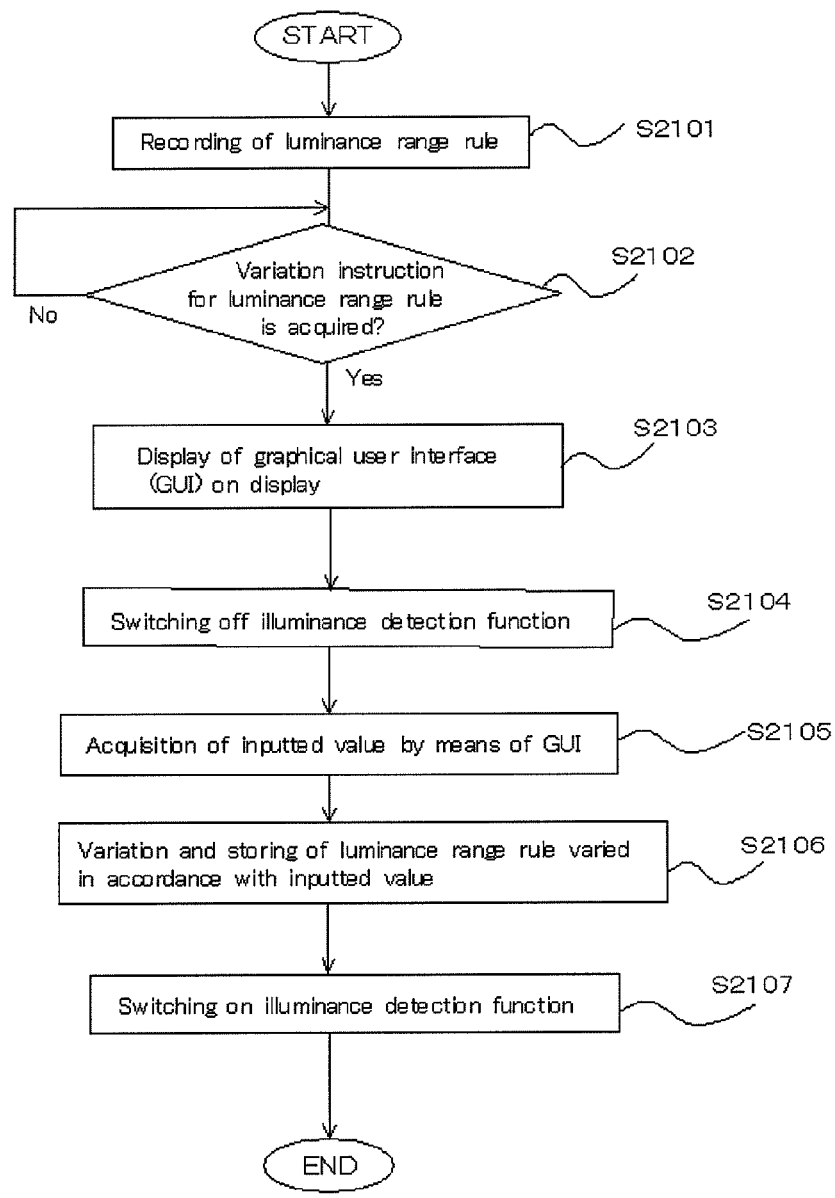
FIG. 21 is a flow chart showing processing flow of the image display apparatus of the fifth embodiment.

FIG. 21 is a flow chart showing processing flow of the image display apparatus of the fifth embodiment. Note that the following steps may be processing steps for configuring a program, which is recorded in a medium to control a computer. As shown in FIG. 21, at the outset, luminance range rule is recorded to be stored (step S2101). After that, when the variation instruction for luminance range rule is acquired (step S2102), for example, GUI is displayed on the display (step S2103). Subsequently, according to the display of GUI, when the detection function of illuminance is turned off (step S2104). When the value inputted by means of the GUI is acquired (step S2105), the luminance range rule is varied and is stored according to the inputted value (step S2106). Subsequently, the variation of the luminance range rule is completed, the detection function of illuminance is turned off (step S2107), and the calculation of the display luminance in accordance with the surrounding illuminance of environment and with the predetermined rule is carried out.

<Brief Description of Effects of Fifth Embodiment>

As described above, according to the image display apparatus of the fifth embodiment, when the user carries out the setting of the luminance range rule by means of GUI etc., power supply to the 'sensor for amount of light' etc. as the detection unit for illuminance is stopped, and the function can be turned off, thereby effectively saving energy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image display apparatus, comprising:
    a display unit, which operates in accordance with calculated luminance;
    a detection unit for illuminance, which detects a surrounding illuminance;
    a calculation unit for display luminance, which calculates the display luminance of the display unit based on the surrounding illuminance detected by the detection unit for illuminance and on a predetermined rule;
    a storing unit for rule, which stores said predetermined rule; and
    a variation unit for rule, which varies, based on user's input, the rule stored in said storing unit for rule, wherein said storing unit for rule further comprises,
    storing means for luminance range rule, which stores a rule for determining a maximum value and a minimum value of the display luminance determined in accordance with the surrounding illuminance as the predetermined rule, wherein said variation unit for rule further comprises, external input means for inputting values utilizing user interface on the display;

variation means for luminance range rule, which varies the maximum value and the minimum value in accordance with the inputted values by the external input means; and variation restriction means dependent on illuminance, which restricts the variation by the variation means for luminance range rule in accordance with the surrounding illuminance detected by the detection unit for illuminance, and wherein said variation restriction means dependent on illuminance restricts the variation, so that only the maximum value in the storing means for luminance range rule is variable if the surrounding illuminance is more than a threshold as a predetermined illuminance, and restricts the variation, so that only the minimum value in the storing means for luminance range rule is variable if the surrounding illuminance is less than the threshold as the predetermined illuminance.

2. The image display apparatus according to claim 1, wherein said storing unit for rule further comprises, storing means for candidate rule, which stores a plurality of candidate rules utilizable for calculation as the predetermined rule by the calculation unit for display luminance, and the calculation unit for display luminance further comprises, selection means, which selects a rule to be utilized as the predetermined rule from the plurality of candidate rules stored in the storing means for candidate rule.

3. The image display apparatus according to claim 2, wherein the selection means acquires one or more than one of a combination of a type of content to be a display object, a type of received broadcast data to be a display object, control information of displayed content correlated with the content to be a display object, and control information of displayed broadcast data correlated with the received broadcast data to be a display object, thereby carrying out said selection in accordance with the control information of the acquired one or more than one combination.

4. The image display apparatus according to claim 1, wherein said external input means further comprises an input bar indicator, which indicates at least one of an input bar indicating only an assignable range of the maximum value as an input screen in cases where the surrounding illuminance is more than the threshold as the predetermined illuminance, and an input bar indicating only an assignable range of the minimum value as an input screen in cases where the surrounding illuminance is less than the threshold as the predetermined illuminance.

5. An image display method, comprising:

a recording step, which records, in a storing unit for rule, a predetermined rule for calculating display luminance of the display according to a surrounding luminance;

a variation step for rule, which varies, based on user's input, the predetermined rule recorded and stored in said recording step;

a detection step for illuminance, which detects a surrounding illuminance;

a calculation step for display luminance, which calculates display luminance of a display unit based on the surrounding illuminance detected by the detection step for illuminance and on the predetermined rule; and an operation step for display, which operates the display unit in accordance with the calculated luminance, wherein the predetermined rule recorded in said recording step is a luminance range rule, which stores a rule for determining a maximum value and a minimum value of the display luminance determined in accordance with the surrounding illuminance, wherein said variation step for rule further comprises, an external input step for inputting values utilizing user interface on the display unit;

a variation step for luminance range rule, which varies said maximum value and minimum value in accordance with the inputted values in the external input step; and said variation step for luminance range rule is a variation step for luminance range rule with restriction on variation dependent on illuminance, which restricts variation in accordance with the surrounding illuminance detected in the detection step for illuminance, and wherein said variation step for luminance range rule with restriction on variation dependent on illuminance restricts the variation, so that only the maximum value in the luminance range rule is variable if the surrounding illuminance is more than a threshold as a predetermined illuminance, and restricts the variation, so that only the minimum value in the luminance range rule is variable if the surrounding illuminance is less than the threshold as the predetermined illuminance.

6. The image display method according to claim 5, wherein the predetermined rule recorded in said recording step is a plurality of candidate rules, comprising:

a selection step, which selects a rule to be utilized in the calculation step for display luminance as the predetermined rule from the plurality of candidate rules which have been recorded and stored.

7. The image display method according to claim 6, wherein the selection step acquires one or more than one of a combination of a type of content to be a display object, a type of received broadcast data to be a display object, control information of displayed content correlated with the content to be a display object, and control information of displayed broadcast data correlated with the received broadcast data to be a display object, thereby carrying out said selection in accordance with the control information of the acquired one or more than one combinations.

8. The image display method according to claim 5, wherein said external input step displays at least one of an input bar indicating only an assignable range of the maximum value as an input screen in cases where the surrounding illuminance is more than the threshold as the predetermined illuminance, and an input bar indicating only an assignable range of the minimum value as an input screen in cases where the surrounding illuminance is less than the threshold as the predetermined illuminance.

9. The image display method according to claim 5, wherein said storing unit for rule further comprises, storing means for luminance range rule, which stores a rule for determining a maximum value and a minimum value of the display luminance determined in accordance with one or more than one of the combination of the type of content to be a display object, the type of received broadcast data to be a display object, the control information of displayed content correlated with the content to be a display object, and the control information of displayed broadcast data as the predetermined rule.

* * * * *